US009553728B2

(12) United States Patent
Boldyrev et al.

(10) Patent No.: US 9,553,728 B2
(45) Date of Patent: Jan. 24, 2017

(54) METHOD AND APPARATUS FOR PROVIDING END-TO-END SECURITY FOR DISTRIBUTED COMPUTATIONS

(75) Inventors: Sergey Boldyrev, Söderkulla (FI);
Jari-Jukka Harald Kaaja, Järvenpää (FI); Hannu Ensio Laine, Espoo (FI);
Jukka Honkola, Espoo (FI);
Vesa-Veikko Luukkala, Espoo (FI);
Ian Justin Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 293 days.

(21) Appl. No.: 13/073,456

(22) Filed: Mar. 28, 2011

(65) Prior Publication Data

US 2012/0221861 A1     Aug. 30, 2012

Related U.S. Application Data

(60) Provisional application No. 61/446,725, filed on Feb. 25, 2011.

(51) Int. Cl.
*H04L 9/32*     (2006.01)
*G06F 21/52*     (2013.01)

(52) U.S. Cl.
CPC ............. *H04L 9/3247* (2013.01); *G06F 21/52* (2013.01)

(58) Field of Classification Search
CPC ................................ H04L 9/3247; G06F 21/52
USPC .......................................... 713/176; 717/149
See application file for complete search history.

(56) References Cited

U.S. PATENT DOCUMENTS

| | | | | |
|---|---|---|---|---|
| 4,933,969 A * | 6/1990 | Marshall et al. | ............. | 713/177 |
| 6,990,438 B1 * | 1/2006 | Chowdhury | ........ | G06F 17/5022 |
| | | | | 703/13 |
| 7,062,493 B1 * | 6/2006 | Babka et al. | ................. | 707/756 |
| 7,539,877 B2 * | 5/2009 | Miyata et al. | ................. | 713/194 |
| 8,037,312 B2 * | 10/2011 | Takenaka et al. | ............. | 713/177 |
| 8,209,365 B2 * | 6/2012 | Manjunath | .................... | 707/827 |
| 8,291,232 B2 * | 10/2012 | Lim | ............................. | 713/176 |
| 8,386,835 B2 * | 2/2013 | Dilger et al. | .................. | 714/6.1 |
| 2004/0208197 A1 * | 10/2004 | Viswanathan | ................ | 370/466 |
| 2005/0235154 A1 * | 10/2005 | Serret-Avila | ............ | G06F 21/64 |
| | | | | 713/176 |
| 2008/0095360 A1 * | 4/2008 | Vuillaume et al. | ............. | 380/44 |
| 2008/0098375 A1 * | 4/2008 | Isard | ............................. | 717/149 |
| 2008/0222414 A1 * | 9/2008 | Wang | .................... | H04L 9/0643 |
| | | | | 713/161 |

(Continued)

OTHER PUBLICATIONS

Understanding Full Virtualization, Paravirtualization, and Hardware Assist VMware, Inc. 2007.*

(Continued)

*Primary Examiner* — Christopher Revak
*Assistant Examiner* — Vadim Savenkov
(74) *Attorney, Agent, or Firm* — Ditthavong & Steiner, P.C.

(57) ABSTRACT

An approach is provided for providing end-to-end security in multi-level distributed computations. A distributed computation security platform determines one or more signatures associated with one or more computation closures of at least one functional flow. The distributed computation security platform also processes and/or facilitates a processing of the one or more signatures to generate at least one supersignature. The distributed computation security platform further determines to associate the at least one supersignature with the at least one functional flow.

20 Claims, 16 Drawing Sheets

(56) References Cited

U.S. PATENT DOCUMENTS

| | | | |
|---|---|---|---|
| 2009/0113219 A1* | 4/2009 | Aharonov et al. | 713/193 |
| 2010/0110935 A1* | 5/2010 | Tamassia et al. | 370/256 |
| 2010/0132014 A1 | 5/2010 | Montagut et al. | |
| 2010/0241827 A1* | 9/2010 | Yu et al. | 712/30 |
| 2010/0263037 A1* | 10/2010 | Sirota | 726/8 |
| 2010/0318804 A1 | 12/2010 | Volkovs | |
| 2011/0107059 A1* | 5/2011 | Oh et al. | 712/18 |
| 2012/0290870 A1* | 11/2012 | Shah et al. | 714/4.11 |

OTHER PUBLICATIONS

Polynomial Hash Functions Are Reliable M. Dietzfilbinger et at. 1992.*

Post-Quantum Cryptography: Lattice Signatures Johannes Buchmann et al. 2009.*

Carminati, B. et al., Web Service Composition: A Security Perspective, Web Information Retrieval and Integration, (WIRI '05), pp. 248-253, Apr. 8-9, 2005.

Das, M. et al., Hierarchical Key Management Scheme Using Polynomial Interpolation, SIGOPS Oper. Syst. Rev. 39, 1 (Jan. 2005), pp. 40-47.

Ding, J., et al., Rainbow, a New Multivariable Polynomial Signature Scheme, Applied Cryptography and Network Security, Lecture Notes in Computer Science, Springer Berlin/Heidelberg, 2005, ISBN: 978-3-540-26223-7. vol. 3531, pp. 164-175.

International Search Report for PCT/FI2012/050166 dated Jun. 20, 2012, pp. 1-6.

Lyle, J., Trustable Remote Verification of Web Services, Trusted Computing, Lecture Notes in Computer Science, Springer Berlin/Heidelberg, 2009, ISBN: 978-3-642-000586-2. vol. 5471, pp. 153-168.

Miller, E. et al., W3c, Resource Description Framework (RDF) Model and Syntax, WD-rdf-syntax-971002, Draft, Version 1, Oct. 2, 1997.

Written Opinion for PCT/FI2012/050166 dated Jun. 20, 2012, pp. 1-10.

* cited by examiner

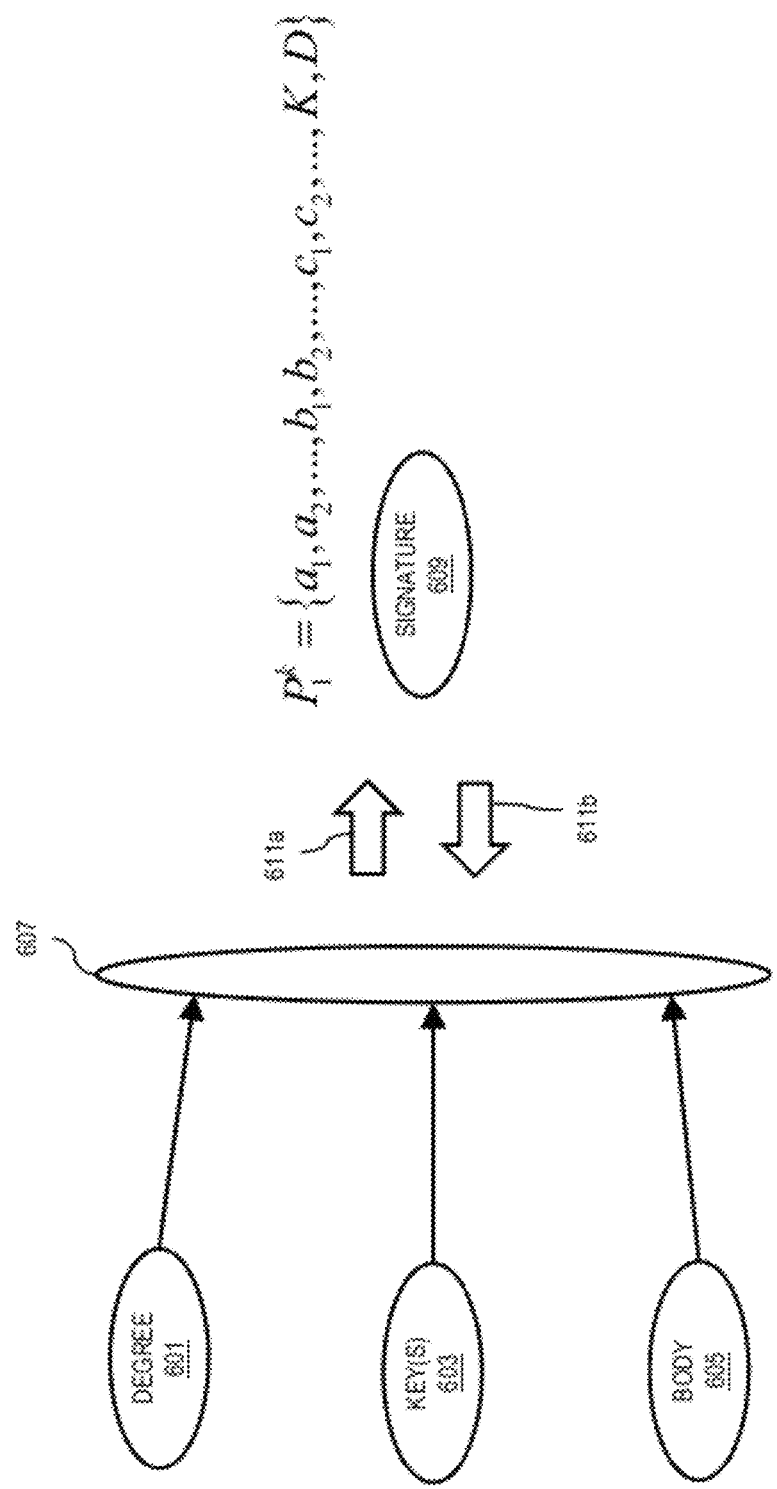

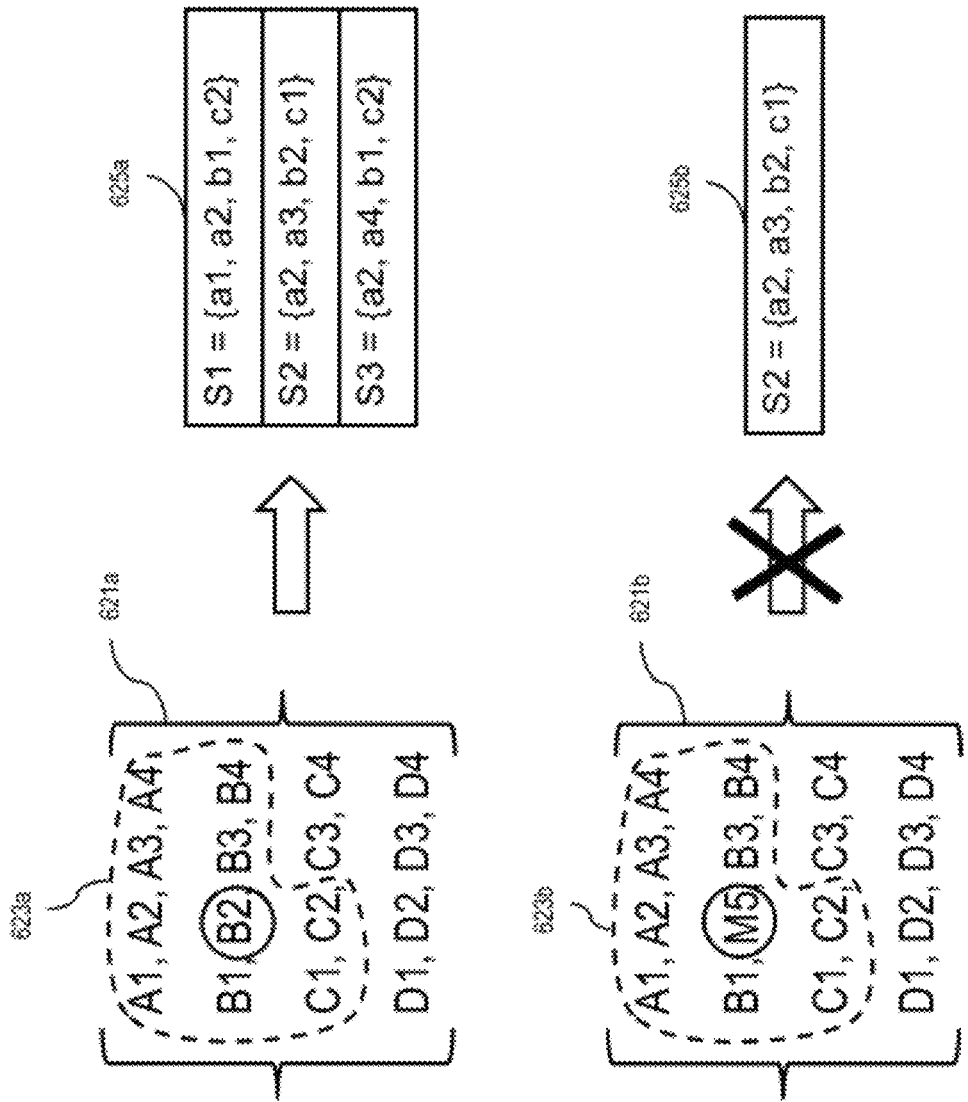

METHOD AND APPARATUS FOR PROVIDING END-TO-END SECURITY FOR DISTRIBUTED COMPUTATIONS

RELATED APPLICATIONS

This application claims the benefit of the earlier filing date under 35 U.S.C. §119(e) of U.S. Provisional Application Ser. No. 61/446,725 filed Feb. 25, 2011, entitled "Method and Apparatus for Providing End-to-End Security for Distributed Computations," the entirety of which is incorporated herein by reference.

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). On the other hand, different levels of proactive computational elements may be available to the device in various other components of various architectural levels (e.g. device level, infrastructure level, etc.), wherein different distributed components may have different capabilities and support different processes. In various example circumstances, to enhance the information processing power of a device and reduce the processing cost, one might consider minimizing or at least significantly improving exchange of data, information and computations among the distributed components within a computational architecture by providing multi-level distributed computations, such that the data can be migrated to the closest possible computation level with minimized or improved cost.

However, despite the fact that information and computation presented by the respective levels of computation architecture can be distributed with different granularity, still there are challenges in certain example implementations to achieve scalable high context information processing within such heterogeneous environments. For example, in various implementations, due to distributed nature of the architecture, (e.g., devices, infrastructures, and clouds), data, information, and computation elements (e.g., computation closures) are being exchanged among distributed devices within heterogeneous network environments wherein information with various levels of granularity and various structures is provided by and transmitted among various independent sources. In such environments, achieving the end-to-end security of exchanged information and computation closures, development time and runtime authentication and contextual validation is an important issue.

SOME EXAMPLE EMBODIMENTS

Therefore, there is a need for an approach for providing end-to-end security in multi-level distributed computations.

According to one embodiment, a method comprises determining one or more signatures associated with one or more computation closures of at least one functional flow. The method also comprises processing and/or facilitating a processing of the one or more signatures to generate at least one supersignature. The method further comprises determining to associate the at least one supersignature with the at least one functional flow.

According to another embodiment, an apparatus comprises at least one processor, and at least one memory including computer program code, the at least one memory and the computer program code configured to, with the at least one processor, cause, at least in part, the apparatus to determine one or more signatures associated with one or more computation closures of at least one functional flow. The apparatus is also caused to process and/or facilitate a processing of the one or more signatures to generate at least one supersignature. The apparatus is further caused to determine to associate the at least one supersignature with the at least one functional flow.

According to another embodiment, a computer-readable storage medium carries one or more sequences of one or more instructions which, when executed by one or more processors, cause, at least in part, an apparatus to determine one or more signatures associated with one or more computation closures of at least one functional flow. The apparatus is also caused to process and/or facilitate a processing of the one or more signatures to generate at least one supersignature. The apparatus is further caused to determine to associate the at least one supersignature with the at least one functional flow.

According to another embodiment, an apparatus comprises means for determining one or more signatures associated with one or more computation closures of at least one functional flow. The apparatus also comprises means for processing and/or facilitating a processing of the one or more signatures to generate at least one supersignature. The apparatus further comprises means for determining to associate the at least one supersignature with the at least one functional flow.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6B are diagrams of supersignature generation and decomposition in multi-level computational architecture, according to one embodiment;

DESCRIPTION OF SOME EMBODIMENTS

Examples of a method, apparatus, and computer program for providing end-to-end security in multi-level distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
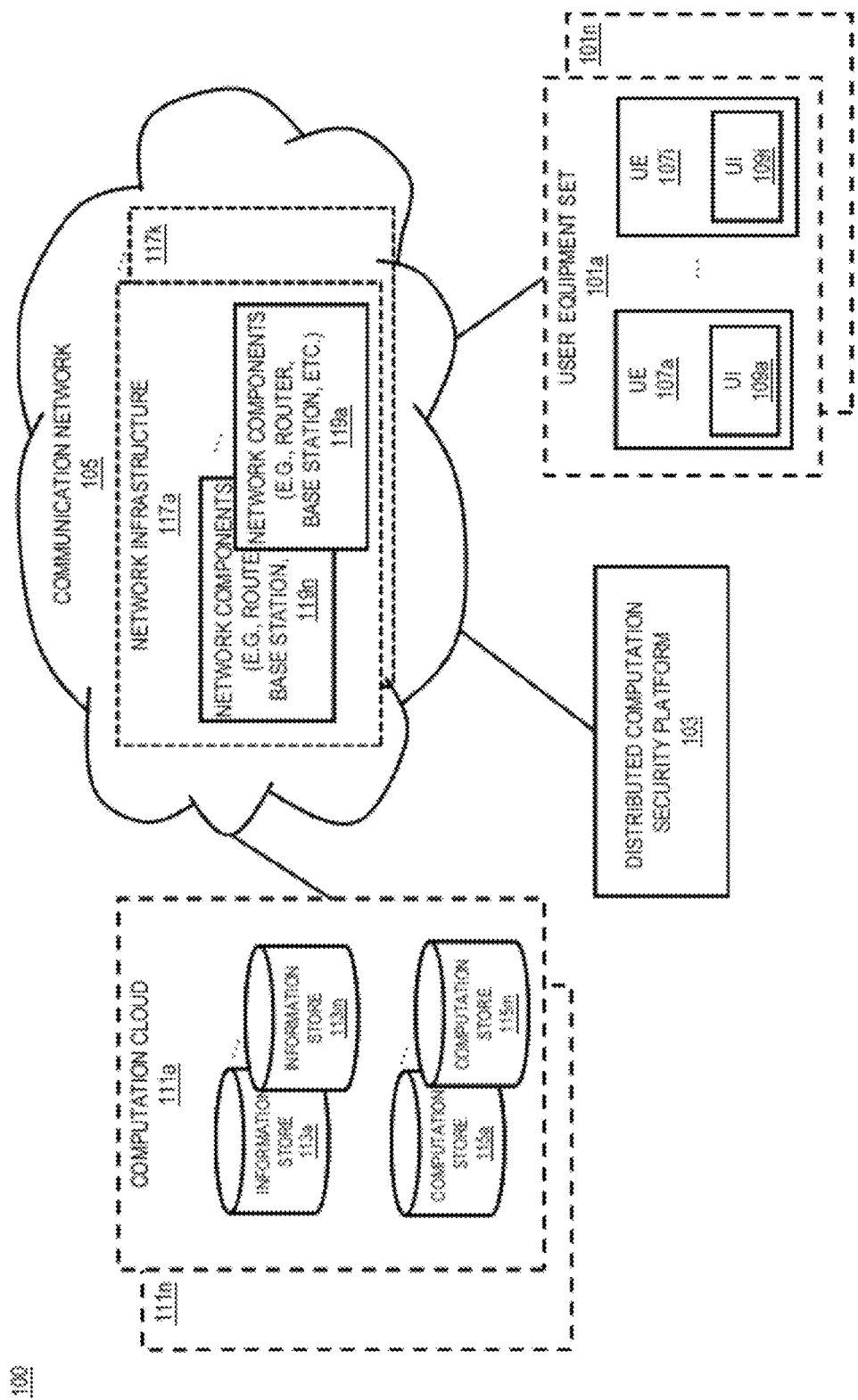
FIG. 1 is a diagram of a system capable of providing end-to-end security in multi-level distributed computations, according to one embodiment.

FIG. 1 is a diagram of a system capable of providing end-to-end security in multi-level distributed computations, according to one embodiment. As previously described, a cloud environment consists of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device. The device can utilize the resources of the architectural infrastructure level, for example for energy saving, without having to access the cloud level, if energy cost is lower at infrastructure level. Alternatively, a device may have direct computational closure connectors to cloud level, where devices are more tightly linked to cloud environment for energy saving purposes.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture consists of a plurality of architectural levels, including a device level, and infrastructure level, and a cloud computing level. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within the cloud computing level which may have various levels of distribution as well. However, the components of the infrastructure levels may be equipped with various resources (e.g., processing environments, storage spaces, etc.) that can be utilized for the execution of computation closures associated with a process. Since the infrastructure level functions as an interface between the device level and the cloud computing level, if the computation closures can be executed in the infrastructure level, there will be no need for the computation closures to be migrated to the cloud computing level that may very well require excessive use of resources. Therefore, execution of computation closures associated with a process related to a device at the infrastructure level can provide services to device users in a more efficient manner. However, components of a multi-level architectural environment composed of device level, infrastructure level and cloud level each may differ in configuration, communication capability, policies applied in terms of ownership, privacy and security of distributed computations, etc.

In one embodiment, a multi-level computation architecture includes mechanism for secure dispersing, processing and assembling of computations around a number of physical or logical components by associating signatures to the computations. The closures may be signed and those signatures utilized for providing secure means for communication between devices, devices to infrastructures, or infrastructures to clouds. Signatures are entities that are generated by means of isomorphic transformations thus represent domain independent fragments that could be interpreted in some cases as at least meaningful information sets. Furthermore, distribution, access and execution of computation closures among components and levels of a multi-level architectural environment may require compatibility among policies and rules of security imposed by various components and levels of architecture.

In one embodiment, different components of each architectural level support different types of closures with different levels and/or types of security defined, enforced, or a combination thereof. Each component (e.g. infrastructure component, node) may have a number of previously created secure entities, closures, links, and distribution paths for the distribution and execution of the computation closures such as connectors between closures, multiple branches, interaction points, rules, etc., that can significantly affect the efficiency of distribution and execution of computations and end-to-end security of the computations in multi-level architectures.

In one embodiment, the computations can be transferred and/or expanded from one component to another or from an architectural level to another (e.g. from infrastructure to cloud). Components and levels of multi-level computation architecture may be equipped with a signature mechanism in order to sign computations and verify signatures by other components to ensure computation security. For example, computations signed by unknown or unapproved entities may be regarded as illegitimate. However, various signature mechanisms may be based on different rules, verification methods, encoding and decoding mechanisms, etc.

In other embodiments, a single sign on (SSO) mechanism may be adopted so that components and levels of the multi-level computation architectures, computation closures, functional flows, etc. can be identified by unique signatures throughout the distributed environment of the multi-level computation architecture. In this embodiment, a computation closure or a set of computation closures may be associated with a signature, wherein the signature is known and is verifiable by multiple components and levels of architecture throughout the environment of multi-level computation structure.

In another embodiment, complex or compound computational closures (also referred to as superclosures) that may represent various computations and are formed based on combination of one or more primitive computation closures, may be associated with complex or compound signatures (also referred to as supersignatures) formed based on combination of one or more signatures of their primitive computation closures (also referred to as root elements). In this embodiment, for example, failure or malfunctioning of a superclosure may be caused by the failure or malfunctioning of its supersignature which in turn may be caused by failure or malfunctioning of one or more of its root element signatures. However, in order to find the defected root elements the supersignature may have to be decomposed wherein the decomposition can be a very complex and resource intensive procedure.

Therefore, there is a challenge to achieve computation security within a heterogeneous environment of multi-level architectures, wherein computations with various levels of granularity and various structures are provided, signed and transmitted among various independent sources.

To address this problem, a system 100 of FIG. 1 introduces the capability to provide end-to-end security in multi-level distributed computations. A computational architecture environment consists of different levels of proactive computational elements available for various levels of the computational architecture such as device level, infrastructure level, and cloud computing level. Since these computational elements provide various levels of functionality for each of the levels of the architecture, providing different levels of distribution of the computational closures within the computational architecture enables the execution of the computational closures after the least required level of distribution. However, a very important functionality for execution of computational closures is to detect, identify, and determine computation security and to ensure security of computational closures, by creating compatibility among various types and levels of existing security measures at each part of the multi-level computational architecture and to determine secure paths for the distribution of computations.

In one embodiment, a cloud may include a superset of closure elements (e.g. closure primitives) and a superset (also referred to as a lattice) of signature root elements while the infrastructure or device level components may have subsets of, and therefore the cloud may be capable of supporting computational closures and their security more effectively compared to the infrastructure or device levels.

In one embodiment, device setup at various architectural levels such as security settings, quality of service (QOS) settings, class of service (COS) settings, priority settings etc., may affect direction and method of computational closure distribution, as different setups may lead to different situations and different available secure distribution paths and requirement. Additionally, computation closures' security can be indirectly affected by other features of architectural levels such as privacy settings, security enforcement strategies, etc. On the other hand, ensuring secure distribution between different architectural levels and components can be achieved by different levels of computation distribution.

In one embodiment, certain amount of computation functionality can be transferred from device level to infrastructure level or further to cloud level depending on the available capabilities and requirements at each level. For example, for computations associated with a public device that is used commonly by multiple users, a strict security measure may not be necessary, while private and confidential computations may require more advanced security measures (e.g. signatures).

In another embodiment, when an infrastructure node has a limited security support capability, the computations may be transferred to a next nearest node with higher security capabilities where computation can continue, and redistributed to the cloud level if there is no infrastructure node with sufficient security support capability. It is noted that various factors such as different device setups, limitations, configurations, any changes that occur in the setups, limitations and configurations during the runtime, etc. may change the direction of computation closure distribution, as security support capabilities may change in accordance with the changing factors.

In one embodiment, operations can be performed to determine and compare security of computation closure processes between devices and infrastructures and between infrastructures and clouds. It can also be determined where it is more cost effective to transfer computation closures to, what the acceptable range of security for one or a group of computation closures is (taking into account other capabilities relevant for the computation such as privacy levels and rules, energy issues like battery vs. main power plug connection, etc). Furthermore, each signature can be associated with a security level so that proper signatures can be assigned to computations based on their security requirements.

In one embodiment, in a multi-level computation architecture associated with a single sign on mechanism, functional flows or groups of distributing computational closures may be signed by unique supersignatures composed of the signatures of their constituting closure primitives and the supersignatures are connected to the a single sign on mechanism.

As shown in FIG. 1, the system 100 comprises a set 101 of user equipments (UEs) 107a-107i having connectivity to distributed computation security platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices.

In one embodiment, process distribution can be initiated for example by means of unicast (e.g., to just another device) or multicast (e.g., to multiple other devices). For example one UE 107 may communicate with many infrastructures (or many components of many infrastructures), while many nodes of infrastructures may communicate with multiple clouds. Additionally, process distribution may be triggered via gesture recognition, wherein the user preselects a particular set of UI elements and makes a gesture to simulate "pouring" the selected UE elements from one device to another. In other embodiments, process distribution may be initiated automatically without direct user involvement and based on default setup by the manufacturer of the UE 107a-107i, previous setup by the user of the UE, default setup in an application activated on or associated with a UE 107a-107i, or a combination thereof.

As seen in FIG. 1, a user of UEs 107a-107i may own, use, or otherwise have access to various pieces of information and computations distributed over one or more computation clouds 111a-111n in information stores 113a-113m and computation stores 115a-115m where each of the one or more computation stores 115a-115m include multiple sets of one or more computation closures. In one embodiment, the user may be an application developer that uses a UE 107a-107i to connect to the infrastructure and the cloud not only for accessing the services provided for end users but also for activities such as developing, distributing, processing, and aggregating various computations.

In one embodiment, the communication network 105 consists of one or more infrastructures 117a-117k wherein each infrastructure is a designed communication system including multiple components 119a-119n. The components 119a-119n include backbones, routers, switches, wireless access points, access methods, protocols, etc. used for communication within the communication network 105 or between communication network 105 and other networks.

In one embodiment, the distributed computation security platform 103 controls the distribution of computations associated with UEs 107a-107i to other components or levels of the computational architecture including the infrastructure level 117a-117k within the environment of the communication network 105, and the cloud level 111a-111n, based on signatures and security enforcement associated with different architectural levels and security requirements of computations.

In one embodiment, security verification of computation distribution may be initiated by the user, or based on a background activity for example by triggering a sequence of computation closures which in turn support distribution process. Prior to computation distribution the capabilities, including the security capabilities of components performing the computations, are evaluated. If capabilities of an architectural level are not satisfactory or changes in capabilities are found, the evaluation process will continue until proper capabilities become available. The security capabilities may be found in the same or other levels of the computational architecture and the computation closure execution will be performed at the level where available capabilities are found.

In another embodiment, network components 119a-119n may provide different levels of functionality. For example, some components 119a-119n may provide static computational closures while others may provide dynamic computational closures. As used herein, static computational closures are closures with predetermined configurations, which in return may require a predefined level of security for execution, while dynamic computational closures are closures that may function differently based on dynamic factors such as time, traffic load, type or amount of available security, etc. In one embodiment, a dynamic computation closure may adjust itself based on the dynamic factors by modifying parameters such as the level of available security. For example, a dynamic computation closure may downgrade itself in order to be handled with a lower level of security. In other embodiments, critical computation closures may be assigned lower and upper acceptable security thresholds wherein available security within that range is acceptable.

In one embodiment the level and type of available security at a component of the infrastructure 117a-117k may or may not be aligned with the required security by computation closures of UE 107a-107i through a one to one mapping. This means that the component may need to locate (or request) other components with higher levels of security capabilities from current or next layer or level of the computational architecture and forward the computations to located components. The component may also have the capability to adjust its security settings and adapt its security capability to the computation requirements. In other words, if the security availability between a process and its processing environment is not directly aligned, the processing environment may expand its capabilities (for dynamic closures) or locate other components (for static closures) or a combination thereof. In one embodiment, if neither the direct alignment succeeds nor alternate environment is found, the setup may be aligned with lower security requirements. The requirements may be lowered, for example by dropping part of the computational closures, substituting complex computations with more primitive computations that may produce less accurate, but accurate enough for user's needs, results. Additionally, the satisfaction threshold may be lowered (with service provider and user's agreement) so that a lower level of computation security can be considered as satisfactory.

In one embodiment, a user of UEs 107a-107i may select certain dynamic computation flows to be used as default computation flow under certain conditions, for example in determined times, for specifically determined computation security levels, etc. In this embodiment, the distributed computation security platform 103 may associate specific levels of priority to the selected computation flows such that, if available, the selected computation flows have priority over other available computations. The selected computation flows and the assigned priorities can determine levels of satisfaction threshold for the user of UEs 107a-107i.

In one embodiment, the computational closures available in multiple levels of device level 101a-101n, infrastructure level 117a-117k, and cloud level 111a-111n and their associated signatures are either aligned, meaning that all the computational closures and signatures are available in every level, or a super-set of all computational closures and signatures is available at cloud level while each lower level has access to a sub-set of the computational closures and signatures from its higher level, for example infrastructure level computational closures and signatures may be a sub-set of the closures and signatures of cloud level and device level closures and signatures a sub-set of the infrastructure level closures and signatures. Additionally, levels of the computational architecture may have sets of functionally equivalent computational closures in the sense that they perform the same process and produce the same results with different levels of accuracy in return for different levels of security requirement. For example, a set of computations providing a map including some restricted areas with high security requirements, may provide the map and exclude the information associated with the restricted area, if a processing environment with sufficient security capability cannot be found.

In one embodiment, a supersignature and its associated superclosures may be decomposed and matched (signed) into the computation flow (flow of computation distribution). In other embodiments, the components and levels of architecture can compile, execute and submit their supersignatures and superclosures to the cloud so that cloud can maintain a lattice of all the available signatures, supersignatures, closures and superclosures throughout the multi-level computation environment. The lattice of the cloud is a superset of all the signatures, supersignatures, closures and superclosures that other levels of the architecture such as UEs 107a-107i (components of device level) and infrastructures 117a-117k have access to. The levels of a computational architecture executing at least one of the one or more computation closures, at least one functional flow, or a combination thereof, have access to root elements associated with those closures and functional flows.

In one embodiment, no differentiation is distinguished between authentication of computations in development time and run time of the end-to-end computation. The distributed computation security platform 103 provides early validation (at component level before the distribution) and contextual validation, wherein closure capabilities (e.g. energy consumption, security elements, privacy rules, etc.) can be represented as data. Additionally, the distributed computation security platform 103 may determine if certain root elements have been changed so that all signatures using that element can be isolated and marked as invalid.

By way of example, the UE 107, the distributed computation security platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
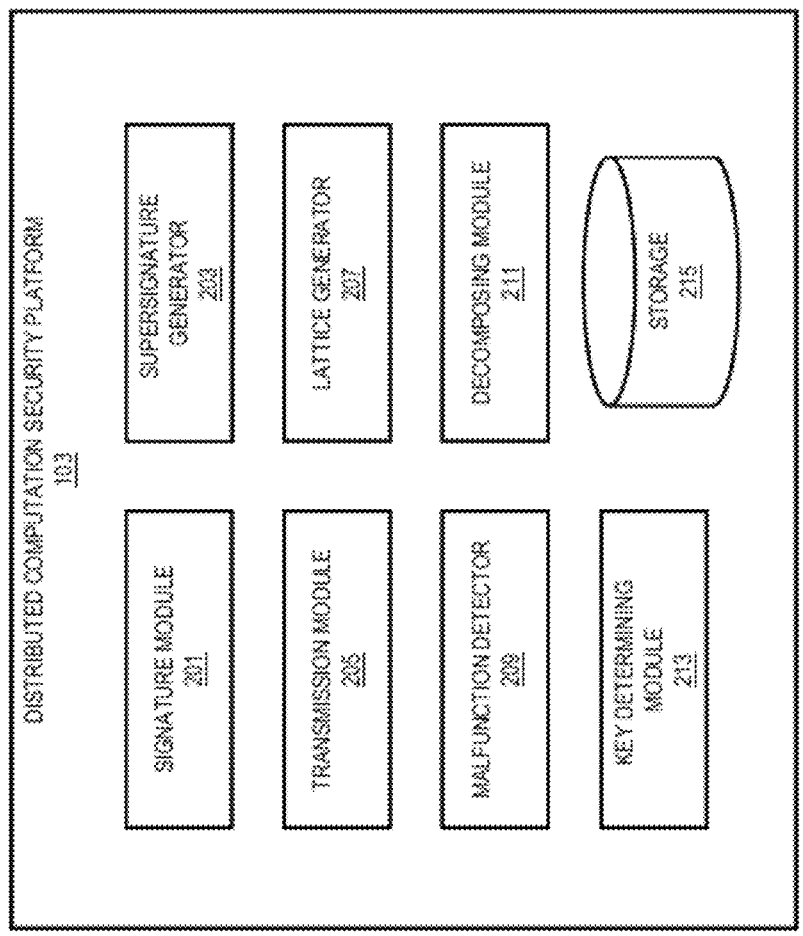
FIG. 2 is a diagram of the components of distributed computation security platform, according to one embodiment.

FIG. 2 is a diagram of the components of distributed computation security platform, according to one embodiment. By way of example, the distributed computation security platform 103 includes one or more components for providing end-to-end security in multi-level distributed computations. It is contemplated that the functions of these components may be combined in one or more components or performed by other components of equivalent functionality. In this embodiment, the distributed computation security platform 103 includes a signature module 201, a supersignature generator 203, a transmission module 205, a lattice generator 207, a malfunction detector 209, a decomposition module 211, a key determination module 213, and a storage 215.

Figure 3:
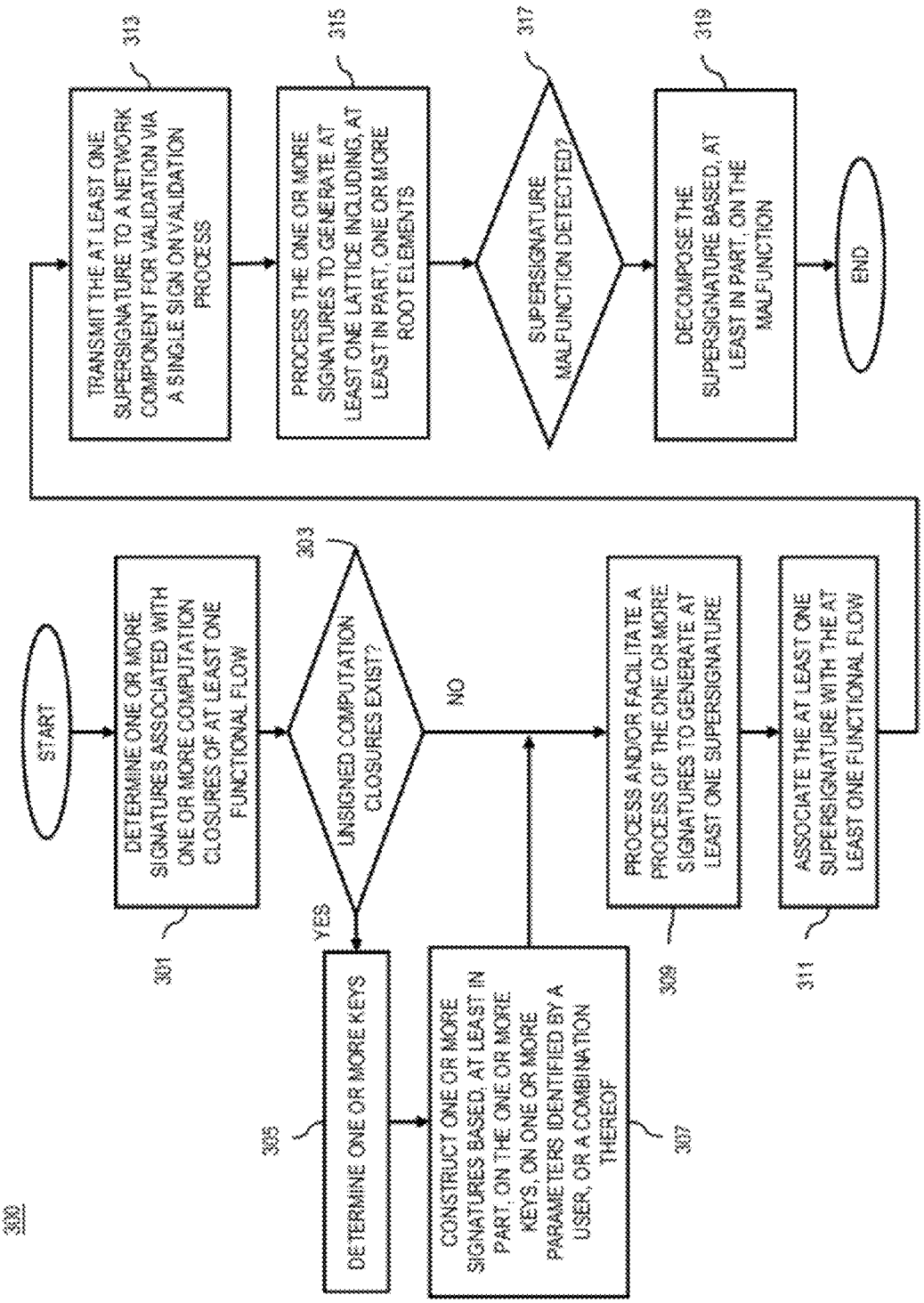
FIG. 3 is a flowchart of a process for providing end-to-end security in multi-level distributed computations, according to one embodiment.

FIG. 2 is described with reference to FIG. 3, wherein FIG. 3 shows a flowchart 300 of a process for providing end-to-end security in multi-level distributed computations, according to one embodiment. In one embodiment, following the start of the execution of a process (for example, associated with an application related to UE 107) the distributed computation security platform 103 is assigned with the task of verifying the security of the end-to-end distribution of computations related to the process according to security capabilities of devices, infrastructures and clouds and security configuration of the computation closures. The computation distribution may be initiated by the user of UE 107, automatically by UE 107 based on pre-determined settings, by other devices or components associated to UE 107, or a combination thereof. Furthermore, the initiation of computation distribution may trigger the activation of distributed computation security platform 103.

In one embodiment, signature module 201 of the distributed computation security platform 103 determines one or more signatures associated with one or more computation closures of at least one functional flow (step 301 of FIG. 3). A functional flow may include one or more computation closures together with one or more distribution paths that represent the distribution of computation closures associated with respective levels of a computational architecture 100, wherein the respective levels include, at least in part, a device level 101a-101n, a infrastructure level 117a-117k, and a cloud computation level 111a-111n (signature determination shown in step 301 of FIG. 3). The computation closures may be signed automatically or manually at development time, at run-time or a combination thereof.

In one embodiment, one or more of the computation closures of a functional flow may have not been previously signed. In this case, per step 303 of FIG. 3, the signature module 201 determines if any unsigned closures exist in the functional flow. If unsigned closures exist, per step 305 the key determination module 213 determines one or more keys based, at least in part, on (a) run time information; (b) an execution context of the at least one functional flow, the one or more computation closures, or a combination thereof; or (c) a combination thereof. It is noted that any data or information associated with one or more computation closures, one or more functional flows or a combination thereof may be used for key determination by the key determination module 213. For example, security parameters and/or security capabilities of run-time environment, functional flows, computational closures, existing signatures (for signed computation closures), etc. can be used as basis for key determination by the key determination module 213.

In one embodiment, the transmitting module 205 transmits the keys determined by the key determination module 213 to a lattice generator 207, wherein the lattice generator 207 retrieves and adds the keys into a matrix of keys associated with the superset or lattice of all signature root elements for a cloud 111a-111n.

In one embodiment, the lattice generator 207 may also generate links between the signatures and supersignatures with their relevant closures, superclosures and functional flows.

In one embodiment, upon determination of one or more keys by the key determination module 213, per step 307 of FIG. 3, the signature module 201 constructs one or more signatures for the unsigned computation closures based, at least in part, on the one or more keys, on one or more parameters identified by a user, or a combination thereof.

In one embodiment, the one or more signatures constructed by the signature module 201 are polynomials that can be induced at least from the parts, a) degree of the polynomial, the highest exponent for a term with non-zero coefficient in a polynomial expressed in canonical form, b) one or more keys (e.g. cryptographic keys) determined by key determination module 213, parameters and coefficients that determine the functional output of the polynomial, and c) a body (e.g. length and shape of the initial constructor of the polynomial).

In one embodiment, the supersignature generator 203, (per step 309 of FIG. 3) processes and/or facilitates a processing of the one or more signatures to generate at least one supersignature consisting of a vector of the signatures. A supersignature provides a unique signature for a functional flow based, at least in part, on the root signature elements of the computation closures included in the functional flow. Per step 311 of FIG. 3, the signature module 201 associates the at least one supersignatures with the at least one functional flows.

In one embodiment, the supersignature, the one or more signatures, or a combination thereof provide end-to-end security for the at least one functional flow over one or more levels of a computational architecture executing the at least one functional flow, the one or more computation closures, or combination thereof.

In one embodiment, per step 313 of FIG. 3, the transmission module 205 causes, at least in part, transmission of the at least one supersignature to a network component (not shown) for validation via a single sign on validation process. The network component may be located in any location having connectivity to the distributed computation security platform 103 via the communication network 105.

In one embodiment, the decomposition module 211 may decompose the signatures and supersignatures into their primitive signature root elements in order for the network component to verify the validity of the supersignatures. In this embodiment, verification keys for root elements can be maintained by the cloud 111a-111n.

As previously discussed, a single sign on (SSO) mechanism provides unique identification for components and levels of the multi-level computation architectures, computation closures, functional flows, etc. throughout the distributed environment of the multi-level computation architecture. In a single sign on environment, a computation closure or a set of computation closures may be associated with a signature, wherein the signature is known and is verifiable by multiple components and levels of architecture throughout the environment of multi-level computation structure.

In one embodiment, the transmission module 205, transmits the, at least one or more signatures to a lattice generator 207, wherein the lattice generator 207 processes and/or facilitates a processing of the one or more signatures to generate at least one lattice including, at least in part, one or more root elements (shown in step 315 of FIG. 3). The lattice may be stored in storage 215, the computation stores 115a-115m, or a combination thereof. Subsequently, the supersignature, the one or more signatures, or a combination thereof can be recombined and/or validated based, at least in part, on the lattice generated by the lattice generator 207, the one or more root elements, or a combination thereof. It is noted that the lattice includes a superset of the signatures, supersignatures, keys, root elements, etc. wherein a cloud 111a-111n is given the authority to reconstruct all signatures and supersignatures from the lattice, while the UEs 107a-107i, the infrastructures 117a-117k and any other components of the multi-level distributed computation environment may have access to only a relevant subset of the lattice.

In one embodiment, a malfunction detector 209 determines at least one malfunction of the supersignature, the one or more signatures, or a combination thereof based, at least in part, on at least one other malfunction of the one or more root elements (shown in step 317 of FIG. 3). The malfunctioning of a signature or supersignature may be detected by the network component that validates the signatures and supersignatures (as seen in step 313 of FIG. 3) and reported to the malfunction detector 209.

In one embodiment, upon detection of a malfunction, the malfunction detector 209 may access the lattice and extract information associated with the malfunctioned signatures and supersignatures from the lattice. The malfunction detector 209 may transfer the extracted information to the decomposition module 211, wherein the decomposition module 211 can decompose the signatures or supersignatures into their building blocks (e.g. root elements) in order to find one or more malfunctioning root elements (shown in step 319 of FIG. 3). As previously described, the root elements are part of a superset of the one or more root elements (subsets of the lattice) stored or mirrored at one or more levels of a computational architecture executing at least one of the one or more computation closures, the at least one functional flow, or a combination thereof.

Figure 4:
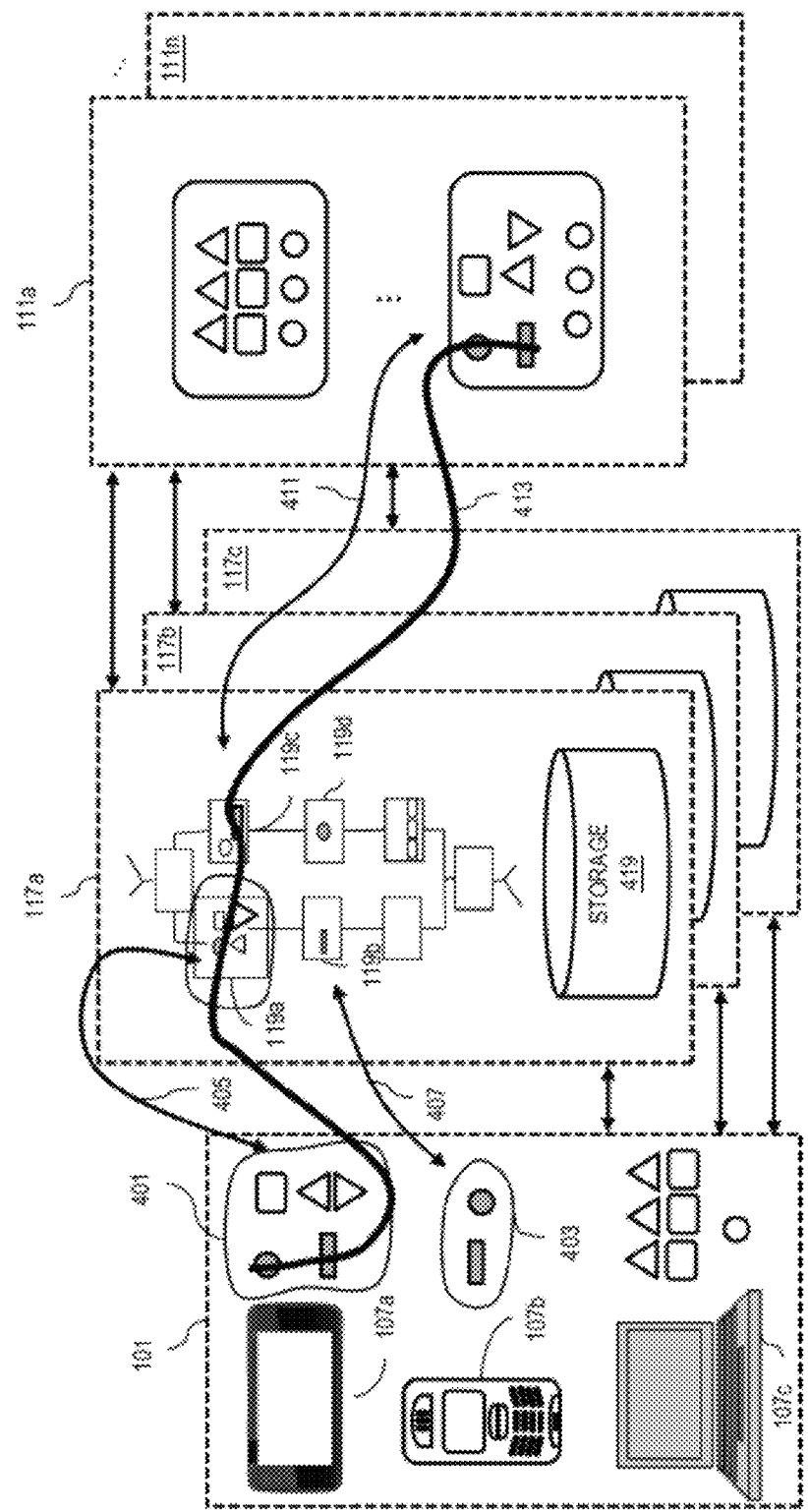
FIG. 4 is a diagram of multi-level computational architecture with signatures, according to one embodiment.

FIG. 4 is a diagram of multi-level computational architecture with signatures, according to one embodiment. In one embodiment, the set 101 comprises UEs 107a, 107b, and 107c, wherein UE 107a needs set 401 and UE 107b needs set 403 of computation closures to be executed. In closure sets 401 and 403, the geometric icons represent computation closures wherein the signed closures are displayed as solidly filled icons while unsigned closures are unfilled icons. In one embodiment, whenever the cost of security evaluation requirement for a set 401 or 403 of computation closures exceeds the device capability on the current level of computational architecture, the computation is distributed to the next level such as infrastructure level. The distributed computation security platform 103 receives a request from UEs 107a and 107b for distribution of sets 401 and 403 respectively. The distributed computation security platform 103 uses the information provided by components such as the signature module 201 or from other levels infrastructures 117a-117c and clouds 111a-111n of the architecture, as described with respect to the flowchart of FIG. 3, in order to select a component of the infrastructure levels 117a, 117b, or 117c for the distribution of computation closures 401 and 403. In the example of FIG. 4, the signed closures of set 401 are distributed to components 119a and 119c of the infrastructure 117a as shown by arrow 405 and the signed closures of set 403 are distributed to components 119b and 119d of the infrastructure 117a shown by arrow 407. Similarly, the infrastructure 117a may distribute the closures further to one or more cloud 111a-111n shown by arrow 411. The path 413 starting from set 401 in UE 107a, continuing through components 119a and 119c of the infrastructure 117a and leading to one or more cloud 111a-111n represents a functional flow for the associated closures. Once the execution is completed, the results of execution of the distributed closures can be aggregated and returned to UEs 107a and 107b.

In one embodiment, the distributed computation security platform 103 may periodically receive updated information about available secure components and paths, security statuses and updated security parameters from the infrastructures and/or clouds. Additionally, the distributed computation security platform 103 may periodically request updates from the infrastructures and/or clouds about the availability status of secure components and paths.

As previously discussed, the capabilities and security availability of either point of the distribution (e.g. UE 107a or component 119a) may change. For example, one or more closures may malfunction. In such cases, the distributed computation security platform 103 determines the change and adjusts the parameters accordingly for the decomposition module 211 to troubleshoot and detect cause of malfunction by decomposing the signatures, supersignature, closures, superclosures, or a combination thereof.

Figure 5A:
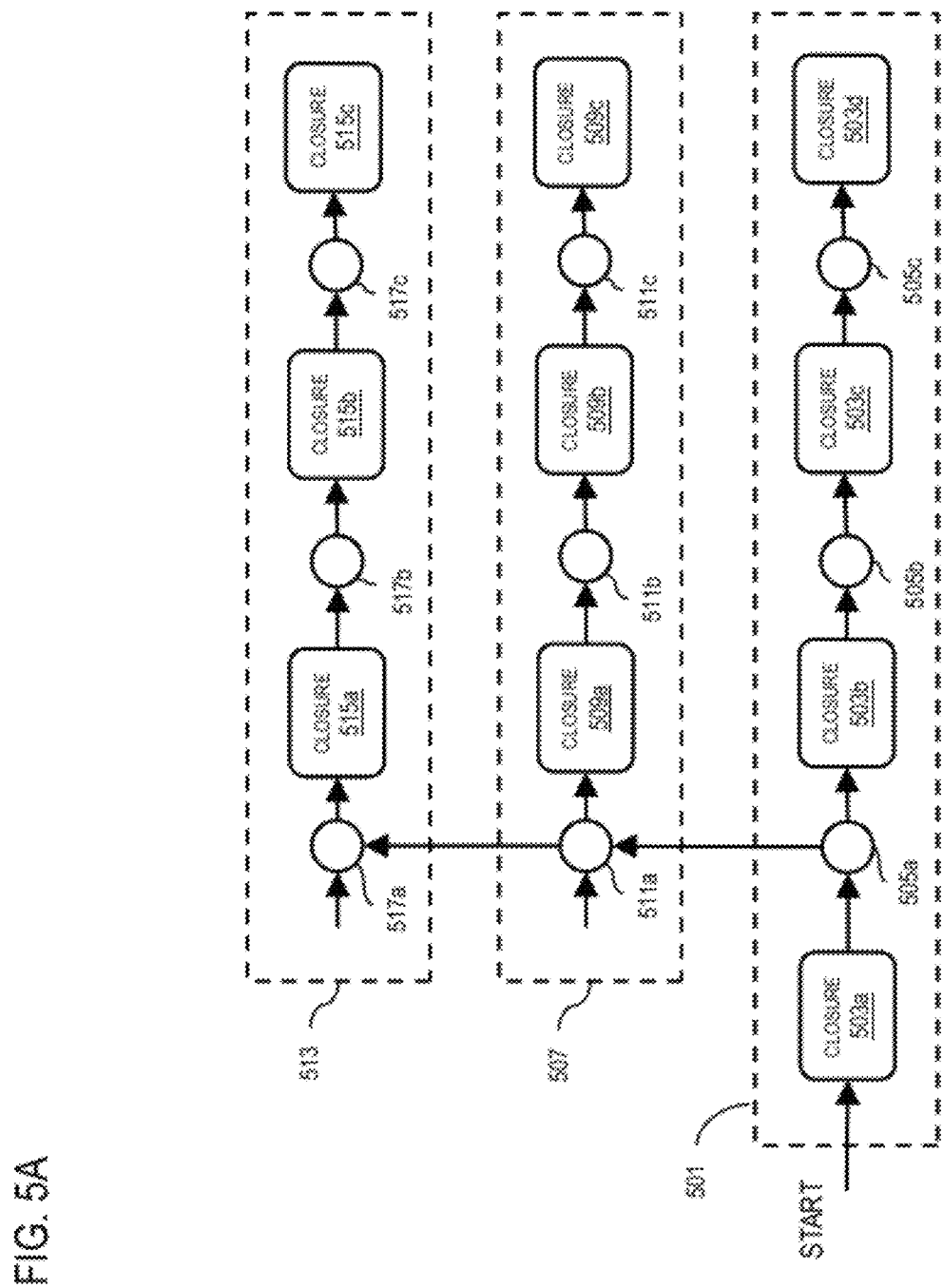
FIGS. 5A-5B are diagrams of distribution of signed computations in multi-level computational architecture, according to one embodiment.
Figure 5B:
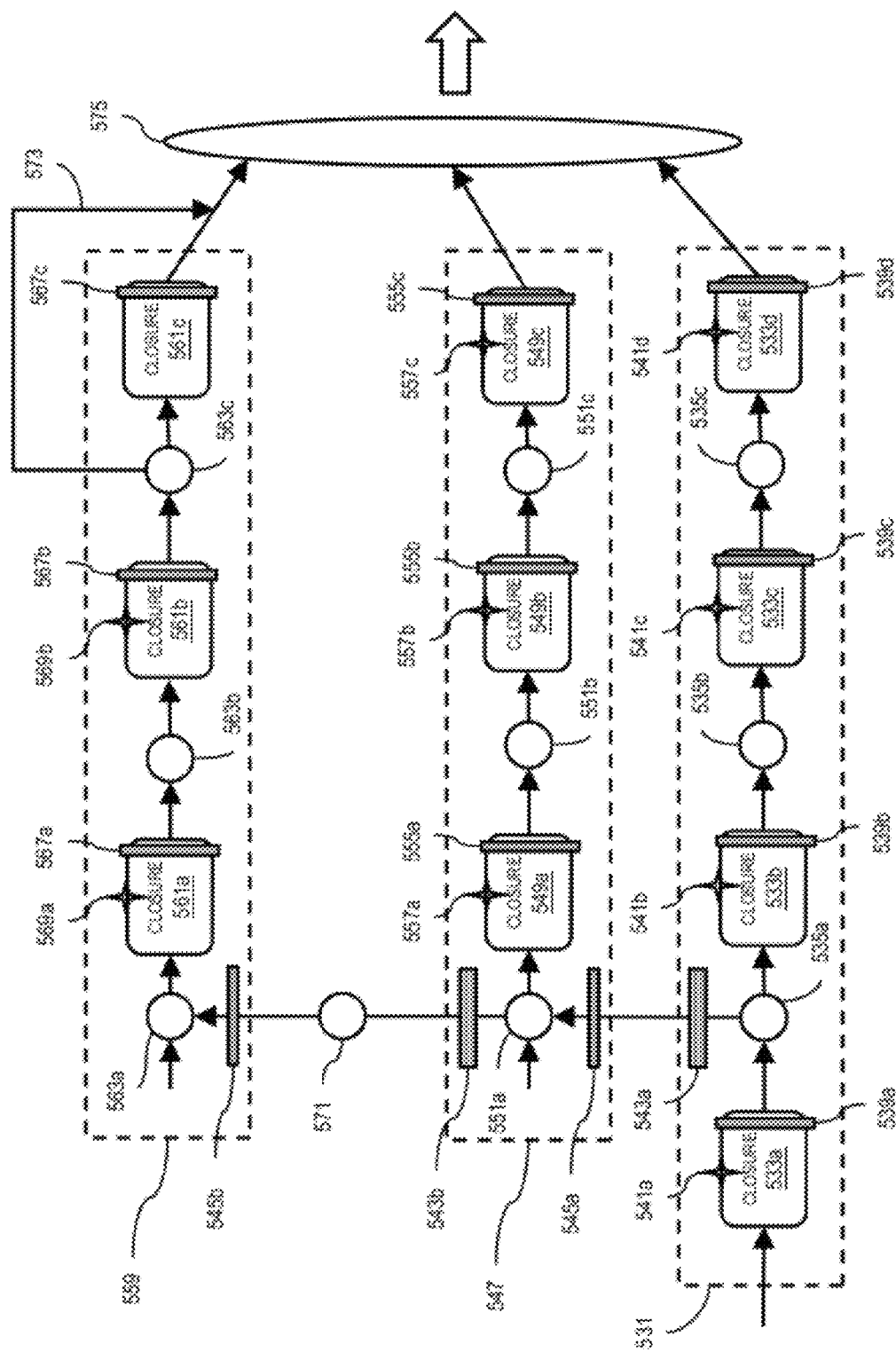

FIGS. 5A-5B are diagrams of distribution of signed computations in multi-level computational architecture, according to one embodiment. FIG. 5A is a general representation of computation distribution. As seen in FIG. 5A, the computation distribution starts at a component 501 of an architectural level (not shown). Each component may execute a set of closures that constitute a computation branch. For example, the branch 501 is composed of closures 503a-503d, wherein every two consecutive closures are connected via a connector and computational branches are communicating via connectors as well. For example, connectors 505a-505c connect closures 503a-503d. Connectors may also transfer information and data associated with a closure and its execution results to the next closure in the branch or to other branches. Additionally, connectors may function as links between related branches that constitute a distributed computation.

In one embodiment, connectors may contain information about parameters such as security requirement and/or capabilities, functional flows, distribution maps, links between closures and architectural levels, etc. Arrows connecting closures to connectors and connectors to next closures show the functional flow adopted based on the parameters. As seen in FIG. 5A, the closures have been distributed from component 501 to component 507 via communication between connector 505a and connector 511a. The computation branch of component 507 includes closures 509a-509c communicating via connectors 511b and 511c, while branches 501 and 507 communicate via connectors 505a and 511a. Similarly, a third branch 513 has been formed of closures 515a-515c being executed at component 513 and connected by connectors 517b and 517c, while the branch communicates with other branches via connector 517a.

In one embodiment, the initial branch 501 may be in a UE 107a-107i, the second branch 507 in a component of the infrastructure 117a-117n, and the third branch in another component of the same infrastructure, a different infrastructure, in a cloud, or a combination thereof.

FIG. 5B shows a computation distribution together with various parameters affecting the distribution. As seen in FIG. 5B, the computation distribution starts at a component 531 of an architectural level (not shown). Each component may execute a set of closures that constitute a computation branch. For example, the branch 531 is composed of closures 533a-533d, wherein every two consecutive closures are connected via a connector and computational branches are communicating via connectors as well. For example, connectors 535a-535c connect closures 533a-533d and connector 571 connects branches 547 and 559. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities including security requirements and availability, a cost function, functional flow specifications, distribution maps, links between closures and architectural levels, etc. Arrows connecting closures to connectors and connectors to next closures show the functional flow adopted based on the parameters. For example, star signs 541a-541d, 557a-557c, and 569a-569b, represent security rules imposed on the closures and the signs 545a-545b represent the security rules imposed on superclosures by the user of UEs 107a-107i, default by the manufacturer of UEs 107a-107i, by the infrastructures 117a-117k, by the clouds 111a-111n, or a combination thereof, and associated with each closure 533a-533d, 549a-549c, and 561a-561c respectively. Additionally, blocks 539a-539d, 555a-555c, and 567a-567c represent signatures for one or more closures, and blocks 543a-543b represent supersignatures for one or more superclosures. In the example of FIG. 5B, the signature 539a shows the signature for closure 533a based on the rules 541a. In one embodiment, if signature 539a is in accordance with rules 541, the signature is validated and the closure 533a can be distributed, however if signature 539a contradicts any rule of rules 541a, the closure 533a will be identified as malfunctioning by the malfunction detector 209.

In one embodiment, the block 543a represents a supersignature composed of a set of signatures 539a-539d and block 545a represents combined security rules of component 547 of the multi-level computation architecture. In this embodiment, if the malfunction detector 209 detects a contradiction between the supersignature 543a and the rules 545a, the decomposition module 211 is activated (as discussed with respect to FIG. 2 and FIG. 3) and decomposes the super signature 543a into its root elements (e.g. 539a-539d) and have the verification network component (not shown) verify the root signatures against rules 545a. The verification may lead to find one or more malfunctioning root elements (e.g. closures 539a-539d).

In one embodiment, a closure or a group of closures may lack access to security rules for the verification of their signatures. For example, in FIG. 5B the closure 561c is signed with signature 567c with no rules. In this embodiment as seen by arrow 573, the distributed computation component that is executing branch 559 bypasses closure 561c without executing the computation 561c. The final results from closure execution of the three branches 531, 547, and 559 are aggregated by result aggregator 575 and forwarded to the requesting device.

FIGS. 6A-6B are diagrams of supersignature generation and decomposition in multi-level computational architecture, according to one embodiment. In one embodiment, detection of malfunctioning of a functional flow by the malfunction detector 209 means that there is at least one malfunctioning closure. However, a closure malfunctioning may not be merely due to an invalid or defective signature, but there might be other reasons such as, for example, the mechanism of signature decomposition being unmanageable and/or unresolvable. In this embodiment, the distribution computation security platform 103 may determine to decompose the supersignatures by the decomposition module 211 and check the validity of signatures, invoke the computational root elements that have satisfied the computation results at the development time, or compose sample signatures by the signature module 201 and submit keys to unlock closures.

In one embodiment, a developer may construct functional flows in order to implement the end-to-end single sign on mechanism. A functional flow may consist of unique supersignatures, wherein valid supersignature may constitute a single sign on process. As seen in FIG. 6A a signature may be a polynomial composed by induction 607, from components such as degree 601, keys 603 and body 605, etc., wherein degree of the polynomial, is the highest exponent for a term with non-zero coefficient in a polynomial expressed in canonical form, one or more keys are encryption keys that can be used for encrypting and decrypting the signatures, and body can be a selected parameter, for example, as the length and shape of the initial constructor of the polynomial.

The formula (1) below represents an exemplary polynomial signature $P_1^k$ of degree D, with cryptographic key K, coefficients $a_1$, $a_2$, $b_1$, $b_2$, $c_1$, and $c_2$ and length 8 (number of components of $P_1^k$ inside the brackets in formula 1.

$$P_1^k = \{a_1, a_2, b_1, b_2, c_1, c_2, K, D\} \quad (1)$$

In one embodiment, signature components of computational closure elements can be atomic (in the body part of the polynomial $P_1^k$, while the single sign on connection is made through the key part of the polynomial.

In various embodiments different signatures can be created based on the above mechanism. Furthermore, an intruder will need access to three different elements (degree, key, body) in order to be able to gain access to a signature and therefore will not be able to reconstruct elements of the root elements of the lattice if only one or two element are known.

FIG. 6B shows decomposition of a signature lattice. Matrix 621a in FIG. 6B represents the lattice consisting of root elements A1-A4, B1-B4, C1-C4, and D1-D4 that all of the signatures in a single sign on environment can be constructed from. For example three signatures S1, S2, and S3 in table 625a are composed from parameters A1, A2, A3, A4, B1, B2, B3, B4, C1 and C2 that comprise a subset 623a of lattice 621a. In the example of FIG. 6B the validation of signatures S1, S2, and S3 can be verified by the content of the lattice 621a. The lattice 621a, that is a superset of all the root elements, is owned and accessed by a cloud 111a-111n, while other levels of the multi-level computation environment, such as device level and infrastructure level can only have access to a subset of the lattice 621a. For example a device with computation closures that use signatures S1-S3 may have access to subset 623a and not to the rest of the lattice 621a. In one embodiment, one or more clouds may share all or part of their root element lattices with one or more other clouds.

Lattice 621b shows the superset of root elements of lattice 621a, wherein the root element B2 is replaced by a new root element M5. In this embodiment, signature S2 cannot be verified based on the content of lattice 621b, because the root element B2 of signature S2 cannot be found in subset 623b of lattice 621a.

In one embodiment, if one or more computation closures (e.g. a closure with signature S2 of table 625b) is being executed at a device level 107a-107i, the validation process may fail and the closure may be attributed as not secure. In this embodiment, the device 107a-107i may request an infrastructure level 117a-117k to execute the closure. Similarly, if the infrastructure cannot validate security of the closure it may request a cloud 111a-111n for processing the closure. However, if neither of the levels of the architecture can obtain closure security approval the closure is eliminated from the transaction in the distributed multi-level computation environment.

In one embodiment, at the development time, a supersignature SS can be constructed based on one or more signatures S1, S2, and S3, for example such that SS=S1¤S2¤S3, wherein ¤ can be considered as an operation for generating a lattice. Additionally, a supersignature SS may have components similar with the components of a signature composed from signature components based on operation ¤. For example Degree(SS)=Degree(S1)¤Degree(S2)¤Degree(S3), Key(SS)=Key(S1)¤Key(S2)¤Key(S3), and Body(SS)=Body(S1)¤Body(S2)¤Body(S3).

In one embodiment, signatures can be resynthesized, recombined and reconstructed from their components degree, key, and body. In FIG. 6A arrow 611*a* shows the direction of forming a signature 609 from its components 601, 603, and 605. Additionally, arrow 611*b* shows the reverse direction for retrieving components 601, 603, and 605 from signature 609, for example for validation purpose.

It is noted that the root elements of a lattice 623*a* can be distributed in an n dimensional space (A, B, C . . . ), three dimensional space in the example of FIG. 6B. A signature (e.g. S1) is a polynomial which may be a simple trajectory in this three dimensional space. Additionally, a trajectory of S1 may overlap with trajectories of one or more other signatures S2, S3, etc.

In one embodiment, the cost of validating or invalidating one or more computation closures based on one or more signatures may be taken into account for calculation of the computation cost function.

Figure 7A:
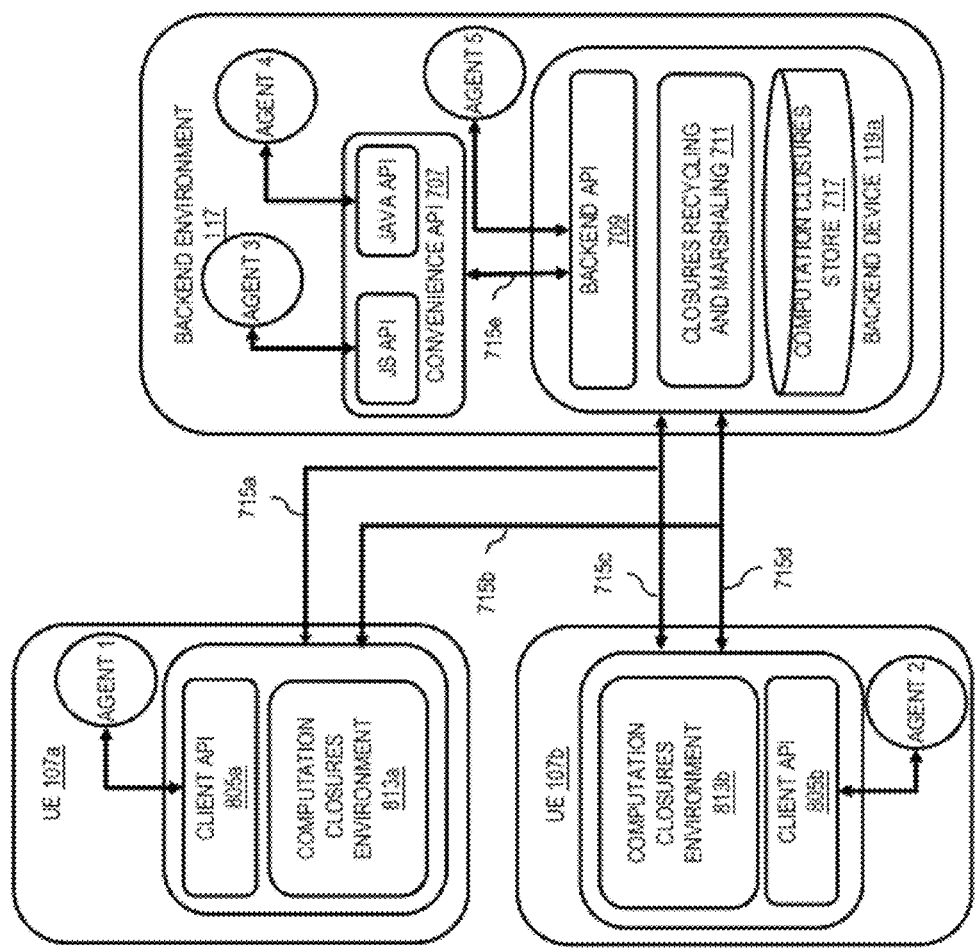
FIGS. 7A-7B are diagrams of computation distribution among devices, according to one embodiment.
Figure 7B:
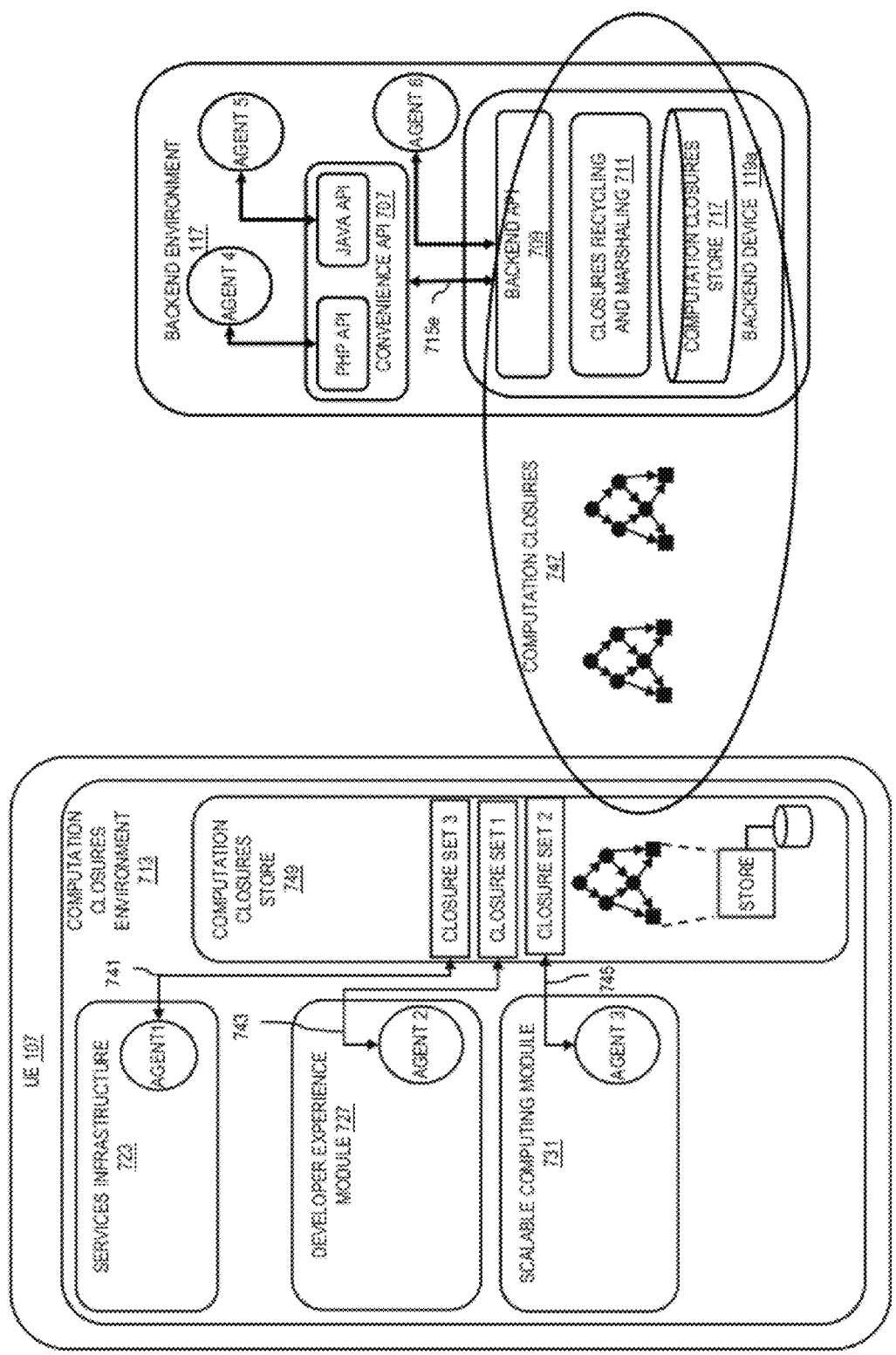

FIGS. 7A-7B are diagrams of computation distribution among devices, according to one embodiment. In one embodiment, in FIG. 7A, the backend environment 117 is a network infrastructure. The backend environment may also be a virtual run-time environment within a cloud 111 associated with the owner of UE 107*a* or on another UE 107*b* associated with the user. The backend environment 117 may include one or more components (backend devices) 119*a* and one or more Application Programming Interface (API) such as a convenience API 707 that may include APIs tailored to the software development environments used (e.g. JAVA, PHP, etc.). Furthermore, UEs 107*a* and 107*b* may include client APIs 705*a* and 705*b*. Each API enables interaction between devices and components within another device or an environment. For example, backend API 709 enables interaction between the backend device 119*a* and Agent5, and convenience API 707 enables interaction between the backend device 119*a* and agents Agent3 and Agent4, wherein each agent is a set of processes that handle computation closures within the backend environment 117. APIs 705*a* and 705*b* enable interaction between UE 107*a* and agent Agent1, and UE 107*b* and agent Agent2 respectively. As seen in the example of FIG. 7A, Agent3 works under PHP while Agent4 is a JAVA process. Each of the UEs 107*a* and 107*b* has a computation closure environment 713*a* and 713*b* which may be part of a cloud 111. Arrows 715*a*-715*e* represent distribution path of computation closures among the environments 713*a*, 713*b* and the computation closures store 717. The computation closures store 717 is a repository of computation closures that can be accessed and used by all the UEs and infrastructure components having connectivity to the backend environment 117.

In one embodiment, the backend device 119*a* may be equipped with a closure recycling and marshaling component 711 that monitors and manages any access to the computation closures store 717. In other embodiments the closure recycling and marshaling (i.e. standardization for uniform use) may be a function of the distributed computation security platform 103.

In one embodiment, the computation closures within environments 713*a*, 713*b* and the computation closures store 717 may be composed based on anonymous function objects and automatically created by a compiling system using methods for generating anonymous function objects such as lambda expressions.

FIG. 7B is an expanded view of a computation closure environment 713 as introduced in FIG. 7A. The computation closure environment 713 may be composed of one or more computation closure generating components. In one embodiment the computation closure environment 713 has a services infrastructure 723 that provides various services for the user of the UE 107. The services may include any application that can be performed on the UE 107 such as, games, music, text messaging, voice calls, etc. In one embodiment, the services infrastructure 723 provides support for closure distribution under the supervision of a distributed computation security platform 103 as discussed in FIG. 1, FIG. 2, and FIG. 3. The agent Agent1 retrieves the computation closures required by the services infrastructure 723 from the computation closures store 749 and stores the newly generated computation closures by the services infrastructure 723 into the computation closures store 749 for distribution purposes per arrow 741.

In another embodiment, the computation closure environment 713 has a developer experience module 727 that provides various tools for a developer for manipulating services offered by the UE 107. The tools may include standardized and/or abstract data types and services allowing the developers to chain processes together across development platforms. In one embodiment, the developer experience module 727 provides cross platform support for abstract data types and services under the supervision of a distributed computation security platform 103 as discussed in FIG. 1. The agent Agent2 retrieves the computation closures required by the developer experience module 727 from the computation closures store 749 and stores the newly generated computation closures by the developer experience module 727 into the computation closures store 749 for distribution purposes per arrow 743.

In yet another embodiment, the computation closure environment 713 has a scalable computing module 731 that provides an abstract wrapper (i.e. monadic wrapper) for the migrating closures 401. This abstraction provides computation compatibility between the closures 401 and the UE 107. The abstract wrapper may provide scheduling, memory management, system calls and other services for various processes associated with the closures 401. These services are provided under the supervision of the distributed computation security platform 103 as discussed in FIG. 1. The agent Agent3 retrieves the computation closures required by the scalable computing module 731 from the computation closures store 749 and stores the newly generated computation closures by the scalable computing module 731 into the computation closures store 749 for distribution purposes per arrow 745. In one embodiment, the backend environment 117 may access the computation closures store 749 and exchange/migrate one or more computer closures 747 between the computation closures store 749 and the backend computation closures store 717.

Figure 8:
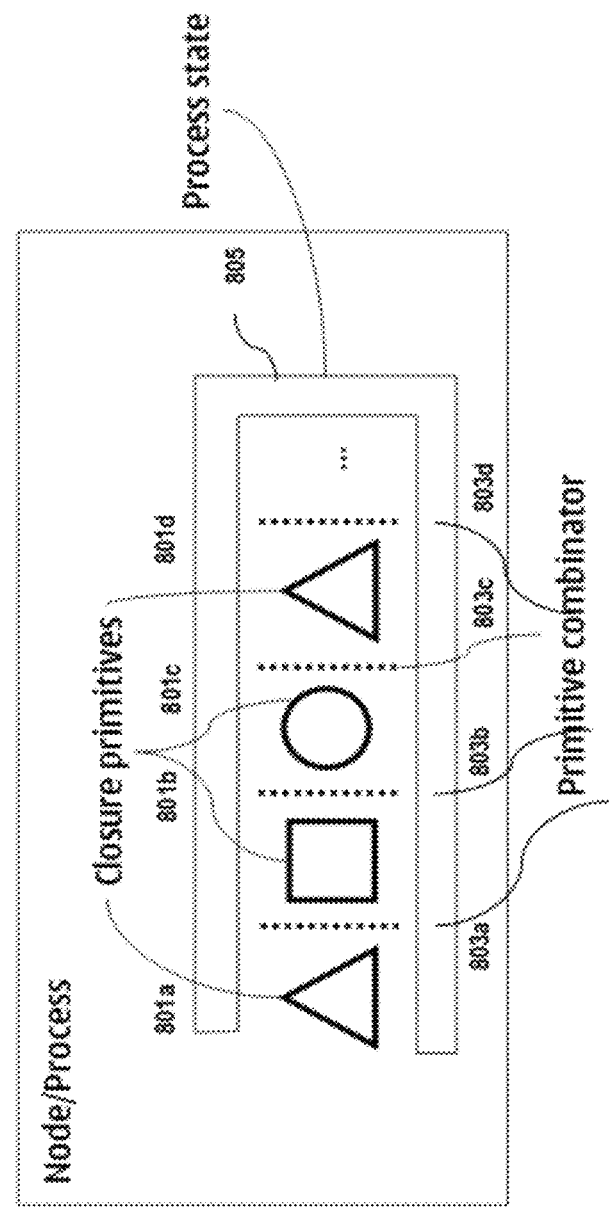
FIG. 8 is a diagram showing a process as a combination of primitive computation closures, according to one embodiment.

FIG. 8 is a diagram showing a process as a combination of primitive computation closures, according to one embodiment. Process 800 consists of closure primitives 801*a*-801*d*. The closure primitives 801*a*-801*d*, which are similar to geometric icon closures of FIG. 4, are combined with each other into process 800 by combinators 803a-803d. The object 805 represents the execution requirements including process states under which the execution of closures 801a-801d combined by combinators 803a-803d will result in the process 800.

In one embodiment, distribution of process 800 includes distribution of closures 801a-801d, combinators 803a-803d and the process states 805 as independent elements into, for instance, an infrastructure environment 117. The independent closures 801a-801d from infrastructure environment 117 may be distributed into different components 119a-119m where they may be executed.

Figure 9:
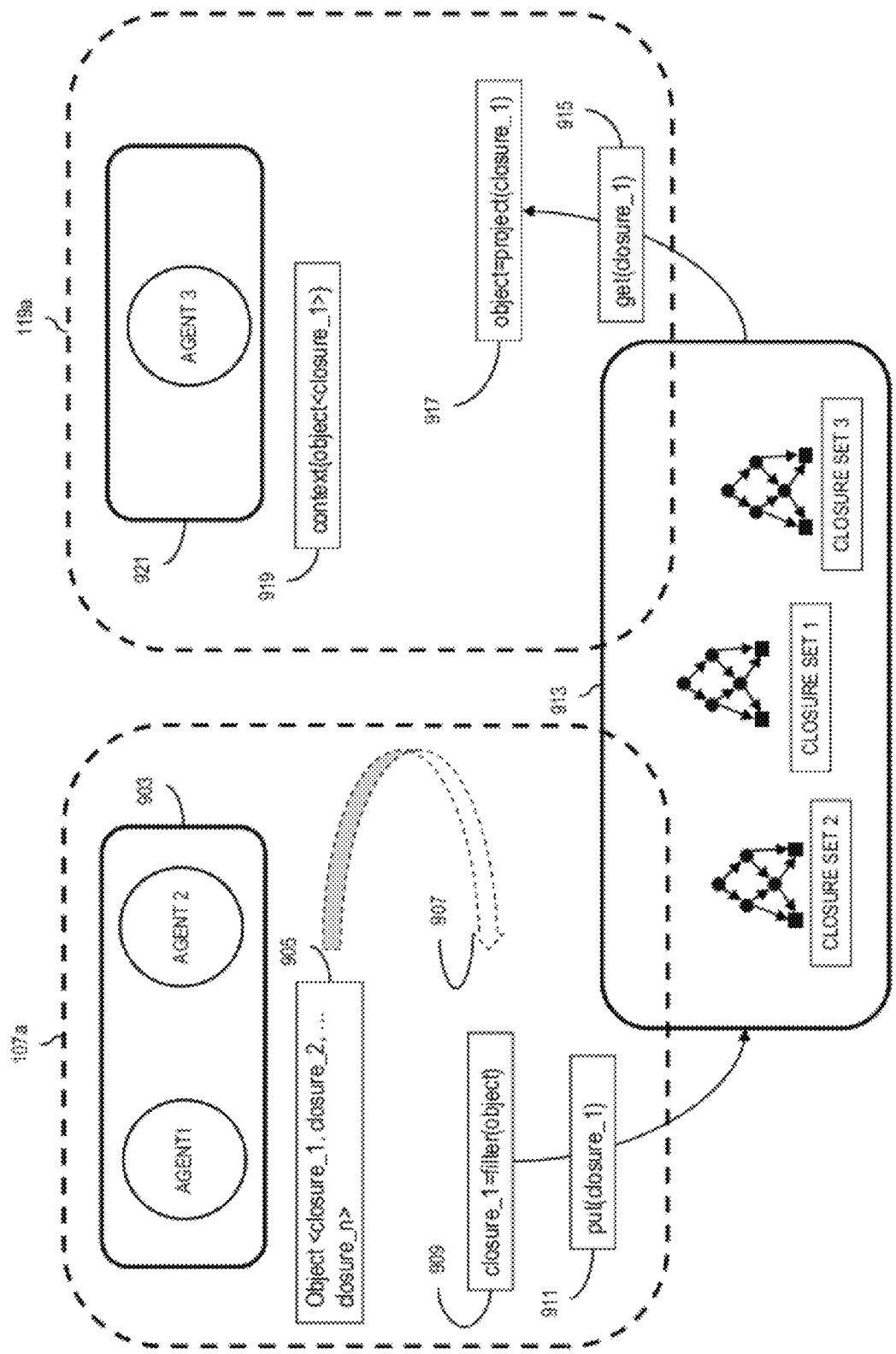
FIG. 9 is a diagram of process distribution from a device to another device, according to one embodiment.

FIG. 9 is a diagram of process distribution from a device to another device, according to one embodiment. In one embodiment, the device 107a is a UE associated with the user. The UE 107a may include a user context 903 which is being migrated among devices. Agent1 and agent2 are processors that calculate and handle computation closures within the user context 903. The number of agents may be different in different devices based on their design, functionality, processing power, etc. Block 905 represents an Object as a set of computation closures, closure_1, closure_2, . . . , and closure_n, where each closure is a component of a larger process, for example, related to a service provided to the user by the user equipment 107a. Each closure is a standalone process that can be executed independently from the other closures. In the example of FIG. 9, the filtering process 907 extracts closure_1 from the closure set Object via filtering the set (shown in block 909). The extracted closure_1 is added to a computation closure store 913 using the exemplary Put command 911.

It is assumed, in this example, that component 119a of an infrastructure level (not shown) is selected by the distributed computation security platform 103 as a destination for closure distribution from UE 107a, based on the availability of sufficient security. The extracted computation closure, closure_1 is migrated to component 119a following the assignment of a distribution path (similar to path 413 in FIG. 4, and is executed on component 119a.

In one embodiment, the component 119a receives the computation closure closure_1 and extracts it from the computation closure store 913 using the Get command 915. The extracted closure_1 is projected into a closure with the user device context and the object 917 is produced. The block 919 represents the reconstruction of the closure into the initial context by a component in charge of the execution. The aggregated context may then be executed in the run-time environment 921 of component 119a by Agent3.

In another embodiment, the UE 107a and component 119a may exchange places and the distribution is performed from the component 119a to UE 107a or both devices may be UEs. In this embodiment the decomposition and aggregation processes are similar to the above example.

Figure 10:
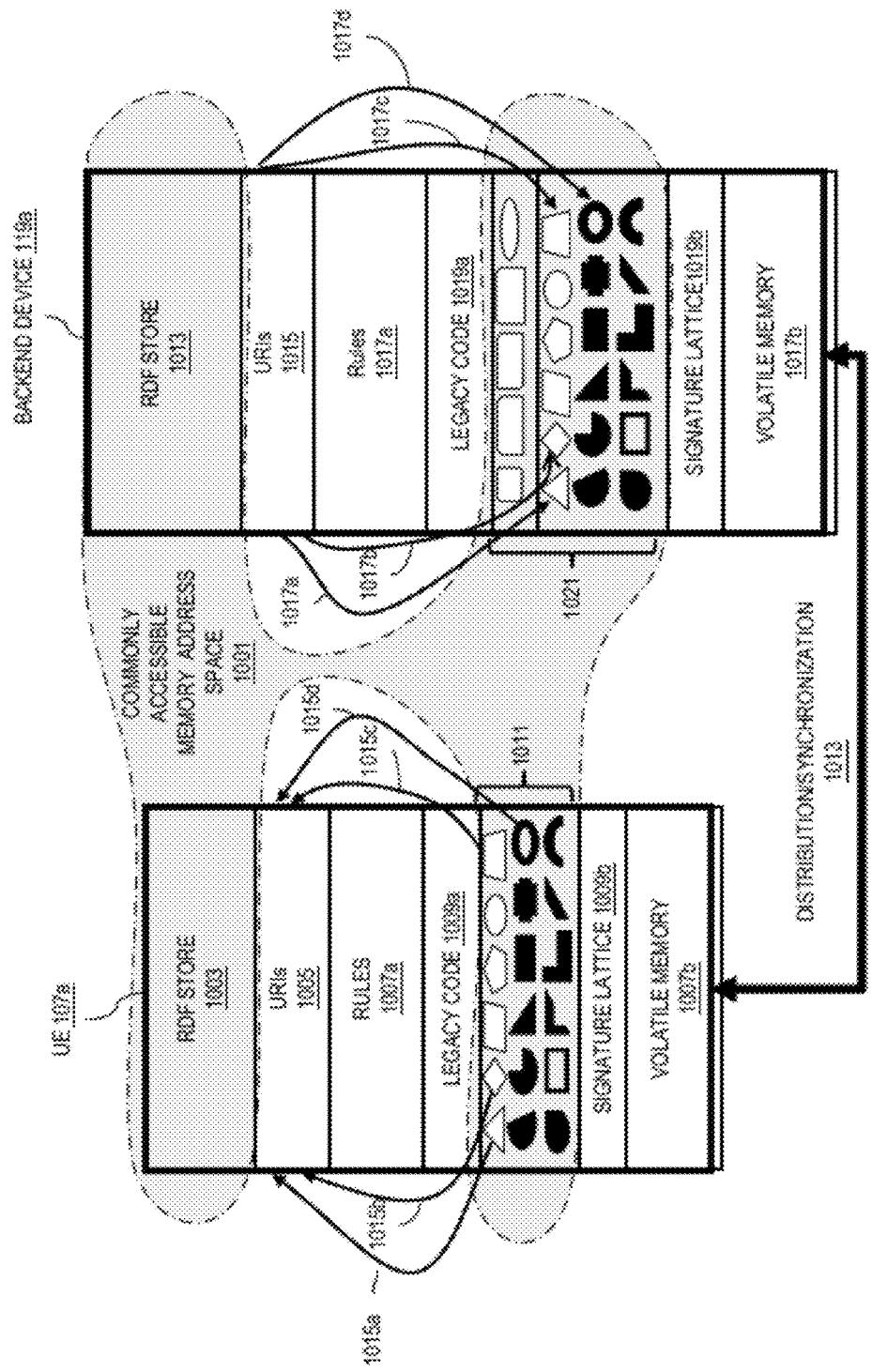
FIG. 10 is a diagram of computation closure allocation/mapping, according to one embodiment.

FIG. 10 is a diagram of computation closure allocation/mapping, according to one embodiment. The diagram of FIG. 10 shows a commonly accessible memory address space 1001 formed between a UE 107a as a client and the backend device 119a as a component of a computation infrastructure 117.

In one embodiment, the UE 107a may include RDF store 1003, which holds computation closures for processes associated with the UE 107a. Similarly the backend device 119a may includes a RDF store 1013, which holds computation closures associated with processes related to device 119a, UEs 107a-107i, or any other devices having connectivity to device 119a or cloud 111.

In other embodiments, the Uniform Resource Identifiers (URIs) 1005 in UE 107a and 1015 in backend device 119a may be used to identify names or resources accessible to their respective devices via the communication network 105. Additionally, UE 107a and backend device 119a may have rule sets 1007a and 1017a that include security rules imposed on device similar to rules 569a-569b of FIG. 5B. It is noted that the rule base 1007a of UE 107a may be a subset of the rule base 1017a of the backend device 119a, wherein the rules 1017a is a subset of a superset of rules managed by a cloud 111. Furthermore, the legacy codes associated with each device may be stored in legacy code memory areas 1009a and 1009b on UE 107a and 1019a and 1019b on backend device 119a.

In one embodiment, UE 107a may be provided with a non-volatile memory space 1011 as a closure store. The closure store 1011 may include a set of closure primitives shown as geometric objects, similar to primitives of sets 401 or 403 of FIG. 4. Similarly, the backend device 119a may be provided with a non-volatile memory space 1021 as a closure store. The closure store 1021 may also include a set of closure primitives shown as geometric objects. In one embodiment, the closure store 1011 is a subset of closure store 1021 determined, at least in part, based on one or more criteria such as time of access, frequency of access, a priority classification, security settings, etc. The geometric shapes of closure stores 1011 and 1021 have been each divided into two groups of solidly filled geometric shapes (representing signed closures) and unfilled geometric shapes (representing unsigned closures). Since non-volatile memories are costly and require extensive resources (e.g. power consumption) compared with volatile memories (such as 1007a, 1007b, 1017a, and 1017b), the capacity of non-volatile memory on a UE 107a-107i is limited. However, a backend device 119a, serving high numbers of users, may be equipped with larger volumes of non-volatile memory spaces. Because of the limited capacity of non-volatile memory spaces on UEs 107a-107i, and also because differing levels of security setup on various devices, only a subset of the closure store 1021 is stored locally at the closure store 1011 for local use by the UE 107a. In order to minimize the number of times a UE 107 needs to retrieve one or more primitives from closure store 1021 of device 109a, the subset 1011 is determined based on one or more criteria. In one embodiment, the closure store 1011 may be determined as a set of the most frequently accessed closure primitives of closure store 1021 by UE 107a. In another embodiment, the closure store 1011 may be determined as a set of the most recently accessed closure primitives of closure store 1021 by UE 107a. In other embodiments, various combined conditions and criteria may be used for determining subset 1011 from set 1021 as the content of closure store for UE 107a. Furthermore, the closure stores 1011 and 1021 may be periodically synchronized. The synchronization of closure stores ensures that any changes (addition, deletion, modification, etc.) in closure primitives and in root elements of the signature lattice of closure store 1021 are reflected in the closure store 1011.

In one embodiment, for execution of a closure set 401 (a subset of closure store 1011) associated with a process on UE 107a, the set 401 can be migrated under the supervision of the distributed computation security platform 103 and after verification of the security of closures and capabilities of the destination component, to the backend device 119a which is a component of the infrastructure 117 (the distribution path shown as arrow 1023). The distributed computation security platform 103 may then inform the processing components of the UE 107a, the backend device 119a or a combination thereof (the processing components are not shown), that the security of closure primitives has been approved and the closures are ready for execution. Alternatively, the distributed computation security platform 103 may determine that the closures are not approved from point of view of the security and terminate their distribution and execution.

In one embodiment, any changes on the closure store 1021 of the backend device 119a (e.g., addition, deletion, modification, etc.) may first enter the URIs 1015 via the communication network 105. The changes may then be applied from URIs 1015 on closure store 1021 shown by arrows 1027a-1027d. Similarly, the closure store 1011 is updated based on the content of the closure store 1021 and the updates are shared with other authorized components within UE 107a (e.g. with URIs 1005 as shown by arrows 1025a-1025d).

In one embodiment, the commonly accessible memory address space 1001 is formed from the RDF stores 1003 and 1013 and the closure stores 1011 and 1021. The commonly accessible memory address space 1001 can be accessed as a continuous memory space by each of the devices 107a and 119a.

The processes described herein for providing end-to-end security in multi-level distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
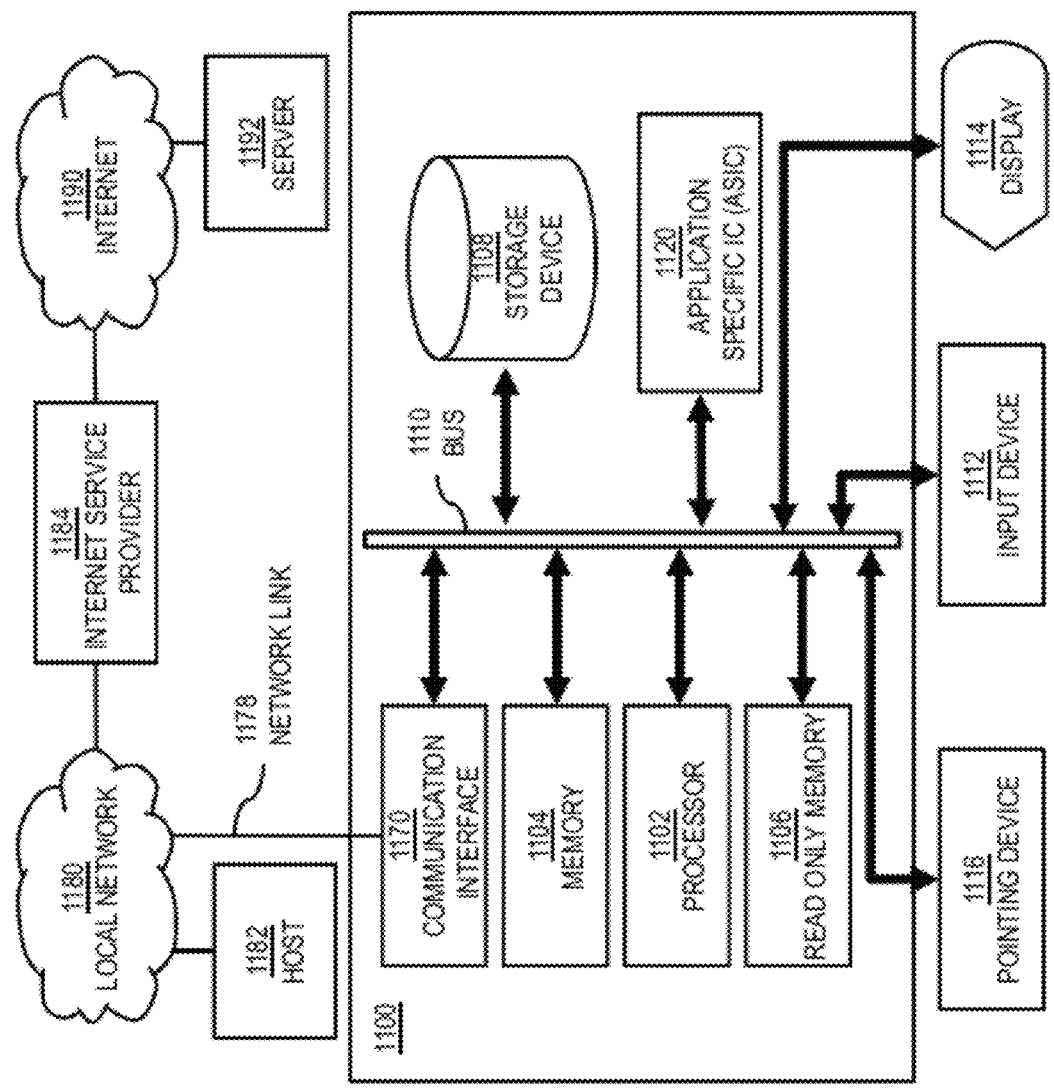
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide end-to-end security in multi-level distributed computations as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing end-to-end security in multi-level distributed computations.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing end-to-end security in multi-level distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing end-to-end security in multi-level distributed computations. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing end-to-end security in multi-level distributed computations, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing end-to-end security in multi-level distributed computations to the UEs 107a-107i from set 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
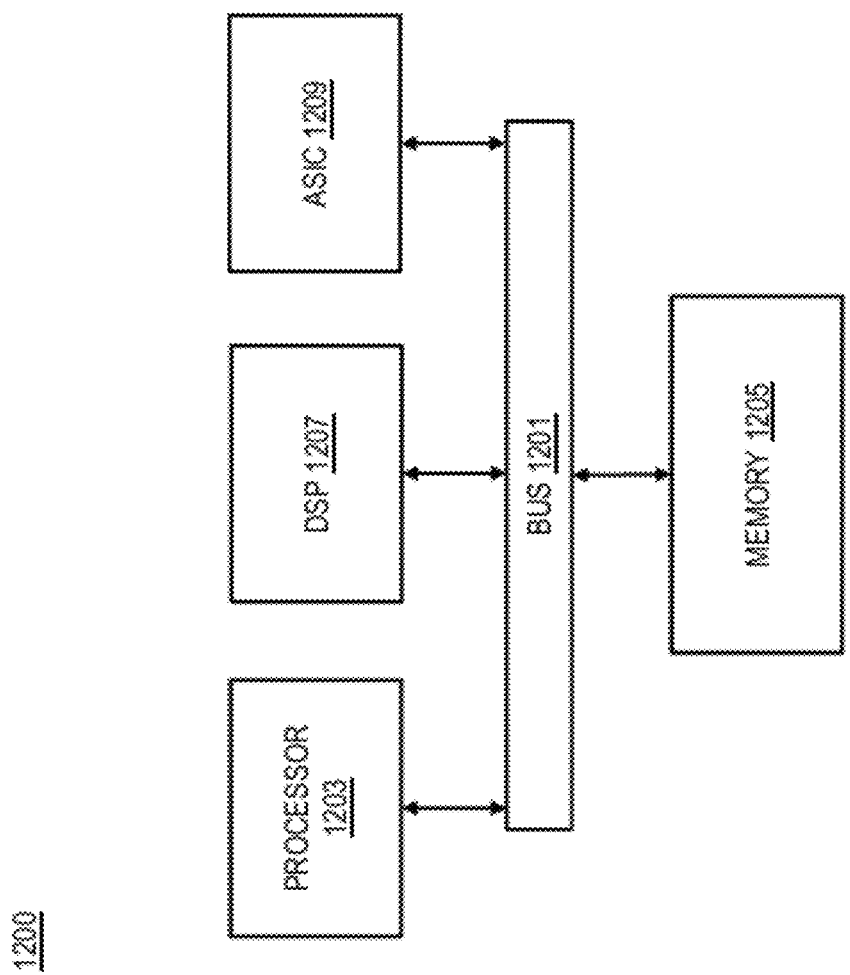
FIG. 12 is a diagram of a chip set that can be used to implement an embodiment of the invention.

FIG. 12 illustrates a chip set or chip 1200 upon which an embodiment of the invention may be implemented. Chip set 1200 is programmed to provide end-to-end security in multi-level distributed computations as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing end-to-end security in multi-level distributed computations.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide end-to-end security in multi-level distributed computations. The memory 1205 also stores the data associated with or generated by the execution of the inventive steps.

Figure 13:
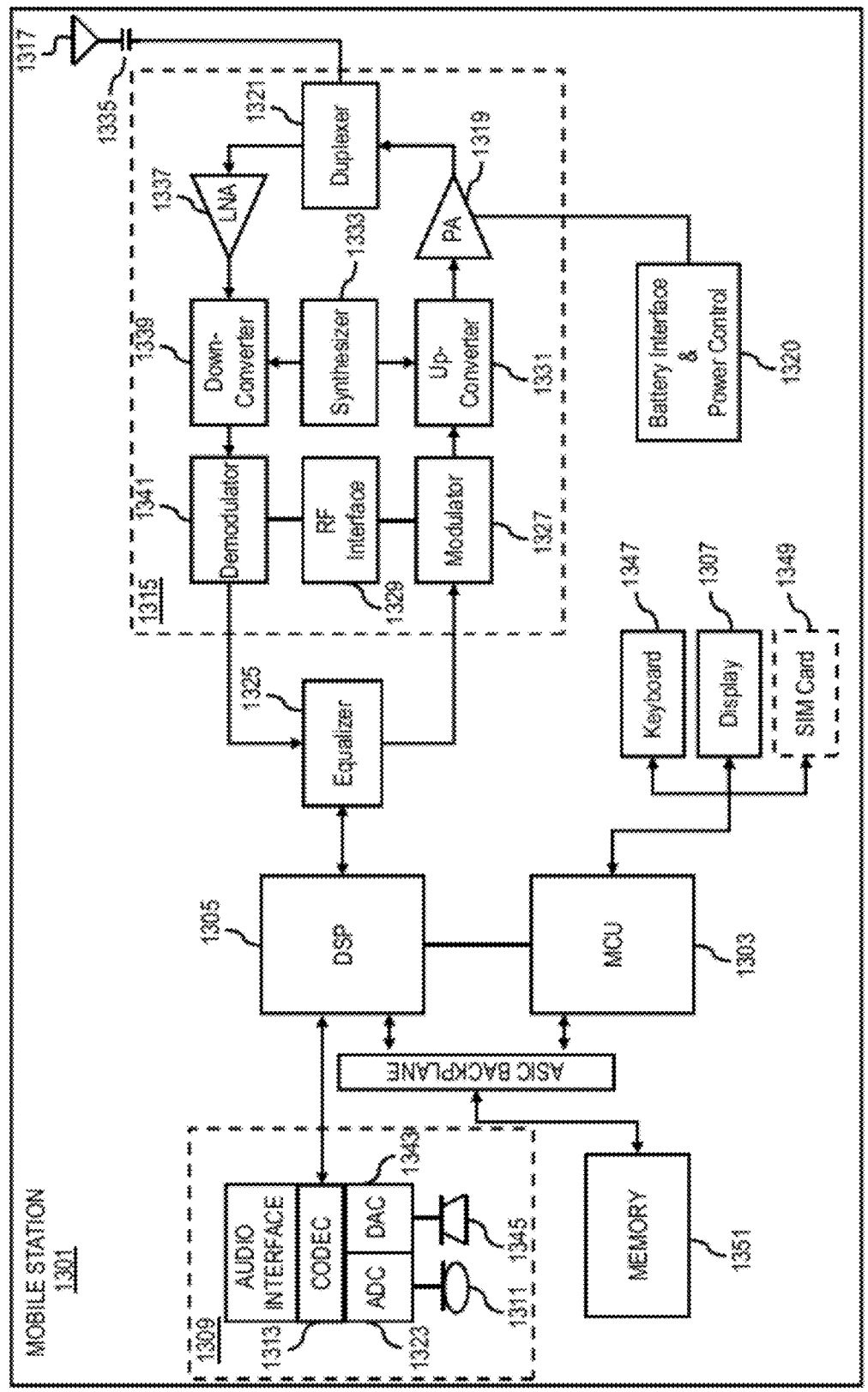
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing end-to-end security in multi-level distributed computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing end-to-end security in multi-level distributed computations. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to providing end-to-end security in multi-level distributed computations. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for constructing, distributing and aggregating computations and related data, the method comprising:
at least one determination of two or more signatures associated with two or more security levels and two or more computational closures of at least one functional flow in a cloud environment;

a processing, via a processor, of the two or more signatures to generate at least one supersignature,
wherein the at least one supersignature provides a unique signature for the at least one functional flow based, at least in part, on one or more root elements of the two or more computational closures in the functional flow;
at least one determination, by at least one processor, to associate the at least one supersignature with the at least one functional flow,
wherein one of the two or more computational closures is at least one critical computational closure and is assigned a lower and upper acceptable security threshold, and
wherein available security within the lower and upper acceptable security threshold is acceptable;
a processing of the two or more signatures to generate and store at least one lattice including, at least in part, the one or more root elements; and
an initiation of a mechanism for a verification of the at least one supersignature, one or more of the two or more signatures or a combination thereof based on the lattice,
wherein the mechanism for verification operates to achieve computational security within a heterogeneous environment of multi-level architectures involving computations with different levels of granularity and different structures which are provided, signed and transmitted among independent sources.

2. The method of claim 1, further comprising:
a validation of the at least one supersignature via a single sign on validation process.

3. The method of claim 1, wherein the supersignature, the two or more signatures, or a combination thereof provide end-to-end security for the at least one functional flow over one or more levels of a computational architecture executing the at least one functional flow, the two or more computational closures, or combination thereof, the one or more levels of the computational architecture including a device level, an infrastructure level, and a cloud computing level.

4. The method of claim 3, wherein the end-to-end security is determined at a development time, at a run time, or a combination thereof of the at least one functional flow, the two or more computational closures or a combination thereof.

5. The method of claim 1,
wherein the supersignature, the two or more signatures, or a combination thereof can be recombined and/or validated based, at least in part, on the lattice, the one or more root elements, or a combination thereof.

6. The method of claim 5, further comprising:
at least one determination of at least one malfunction of the supersignature, the two or more signatures, or a combination thereof based, at least in part, on at least one other malfunction of the one or more root elements.

7. The method of claim 6, further comprising:
an initiation of a mechanism for decomposition of the at least one supersignature based, at least in part, on the at least one malfunction.

8. The method of claim 5, wherein the one or more root elements are part of a superset of the one or more root elements stored or mirrored at one or more levels of a computational architecture executing at least one of the two or more computational closures, the at least one functional flow, or a combination thereof.

9. The method of claim 1, wherein the two or more signatures are inducible polynomials constructed based, at least in part, on one or more keys, on one or more parameters identified by a user, or a combination thereof.

10. The method of claim 9, further comprising:
at least one determination of the one or more keys based, at least in part, on (a) run time information; (b) an execution context of the at least one functional flow, the two or more computational closures, or a combination thereof; or (c) a combination thereof.

11. An apparatus for constructing, distributing and aggregating computations and related data, the apparatus comprising:
at least one processor; and
at least one memory including computer program code for one or more programs,
the at least one memory and the computer program code configured to, with the at least one processor, cause the apparatus to perform at least the following,
determine two or more signatures associated with two or more security levels and two or more computational closures of at least one functional flow in a cloud environment;
process and/or facilitate a processing of the two or more signatures to generate at least one supersignature,
wherein the at least one supersignature provides a unique signature for the at least one functional flow based, at least in part, on one or more root elements of the two or more computational closures in the functional flow;
determine to associate the at least one supersignature with the at least one functional flow,
wherein one of the two or more computational closures is at least one critical computational closure and is assigned a lower and upper acceptable security threshold, and
wherein available security within the lower and upper acceptable security threshold is acceptable,
process the two or more signatures to generate and store at least one lattice including, at least in part, the one or more root elements; and
initiate a mechanism for a verification of the at least one supersignature, one or more of the two or more signatures or a combination thereof based on the lattice,
wherein the mechanism for verification operates to achieve computational security within a heterogeneous environment of multi-level architectures involving computations with different levels of granularity and different structures which are provided, signed and transmitted among independent sources.

12. The apparatus of claim 11, wherein the apparatus is further caused to:
cause, at least in part, validation of the at least one supersignature via a single sign on validation process.

13. The apparatus of claim 11, wherein the supersignature, the two or more signatures, or a combination thereof provide end-to-end security for the at least one functional flow over one or more levels of a computational architecture executing the at least one functional flow, the two or more computational closures, or combination thereof, the one or more levels of the computational architecture including a device level, an infrastructure level, and a cloud computing level.

14. The apparatus of claim 13, wherein the end-to-end security is determined at a development time, at a run time, or a combination thereof of the at least one functional flow, the two or more computational closures or a combination thereof.

15. The apparatus of claim 11,
wherein the supersignature, the two or more signatures, or a combination thereof can be recombined and/or validated based, at least in part, on the lattice, the one or more root elements, or a combination thereof.

16. The apparatus of claim 15, wherein the apparatus is further caused to:
determine at least one malfunction of the supersignature, the two or more signatures, or a combination thereof based, at least in part, on at least one other malfunction of the one or more root elements.

17. The apparatus of claim 16, wherein the apparatus is further caused to:
cause, at least in part, initiation of a mechanism for decomposition of the at least one supersignature based, at least in part, on the at least one malfunction.

18. The apparatus of claim 15, wherein the one or more root elements are part of a superset of the one or more root elements stored or mirrored at one or more levels of a computational architecture executing at least one of the two or more computational closures, the at least one functional flow, or a combination thereof.

19. The apparatus of claim 11, wherein the two or more signatures are inducible polynomials constructed based, at least in part, on one or more keys, on one or more parameters identified by a user, or a combination thereof.

20. The apparatus of claim 19, wherein the apparatus is further caused to:
determine the one or more keys based, at least in part, on (a) run time information; (b) an execution context of the at least one functional flow, the two or more computational closures, or a combination thereof; or (c) a combination thereof.

* * * * *